United States Patent
Gunn, III et al.

(10) Patent No.: US 7,184,626 B1
(45) Date of Patent: Feb. 27, 2007

(54) WAFER-LEVEL TESTING OF OPTICAL AND OPTOELECTRONIC CHIPS

(75) Inventors: Lawrence C. Gunn, III, Encinitas, CA (US); Roman Malendevich, Oceanside, CA (US); Thierry J. Pinguet, Cardif-By-The-Sea, CA (US); Maxime J. Rattier, Paris (FR); Myles Sussman, San Diego, CA (US); Jeremy Witzens, Pasadena, CA (US)

(73) Assignee: Luxtera, Inc, Carlsbad, CA (US)

( * ) Notice: Subject to any disclaimer, the term of this patent is extended or adjusted under 35 U.S.C. 154(b) by 92 days.

(21) Appl. No.: 10/820,631

(22) Filed: Apr. 7, 2004

Related U.S. Application Data

(60) Provisional application No. 60/461,041, filed on Apr. 7, 2003.

(51) Int. Cl.
  *G02B 6/34* (2006.01)
  *G01R 31/302* (2006.01)
(52) U.S. Cl. .................................. 385/37; 324/752
(58) Field of Classification Search .................. None
  See application file for complete search history.

(56) References Cited

U.S. PATENT DOCUMENTS

| | | | | |
|---|---|---|---|---|
| 3,864,016 | A  * | 2/1975 | Dakss et al. ................... | 385/49 |
| 5,416,861 | A  * | 5/1995 | Koh et al. ..................... | 385/14 |
| 5,499,732 | A  * | 3/1996 | Nishimoto .................... | 438/25 |
| 5,500,540 | A  * | 3/1996 | Jewell et al. .................. | 257/82 |
| 5,631,571 | A    | 5/1997 | Spaziani et al. | |
| 6,256,437 | B1 * | 7/2001 | Sakushima et al. ........... | 385/49 |
| 6,385,361 | B1 * | 5/2002 | Corr ............................. | 385/14 |
| 6,438,279 | B1 * | 8/2002 | Craighead et al. ............ | 385/12 |
| 6,555,983 | B1   | 4/2003 | Davies | |
| 6,859,587 | B2 * | 2/2005 | Nikonov et al. .............. | 385/49 |
| 2003/0142914 | A1* | 7/2003 | Jewell et al. .................. | 385/49 |
| 2004/0081399 | A1* | 4/2004 | Zheng et al. .................. | 385/37 |

* cited by examiner

*Primary Examiner*—Paresh Patel
*Assistant Examiner*—Roberto Velez
(74) *Attorney, Agent, or Firm*—Fernandez & Associates, LLP

(57) ABSTRACT

This application describes, among others, wafer designs, testing systems and techniques for wafer-level optical testing by coupling probe light from top of the wafer.

25 Claims, 21 Drawing Sheets

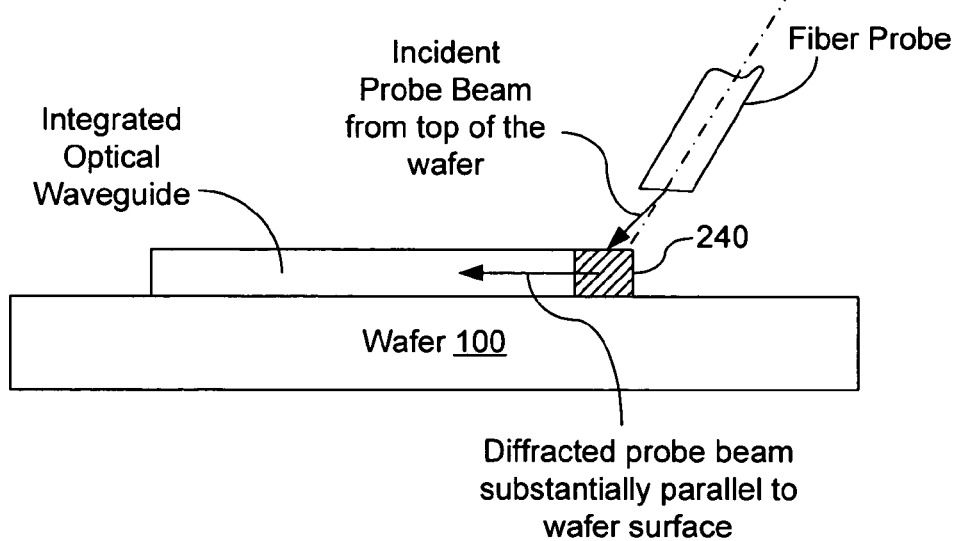
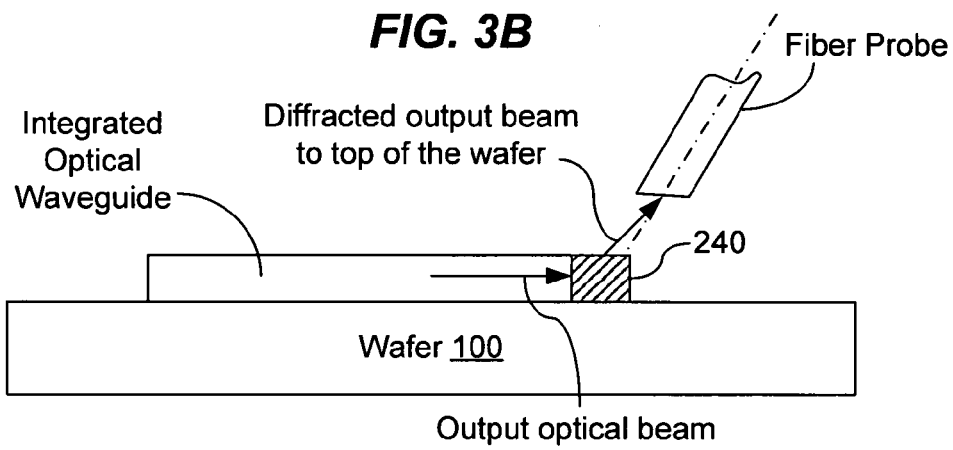
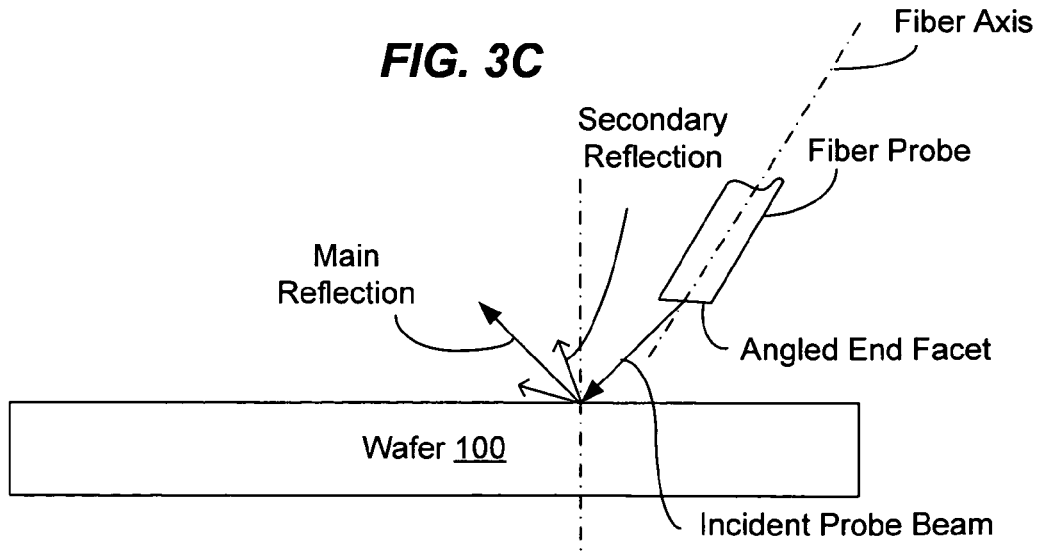

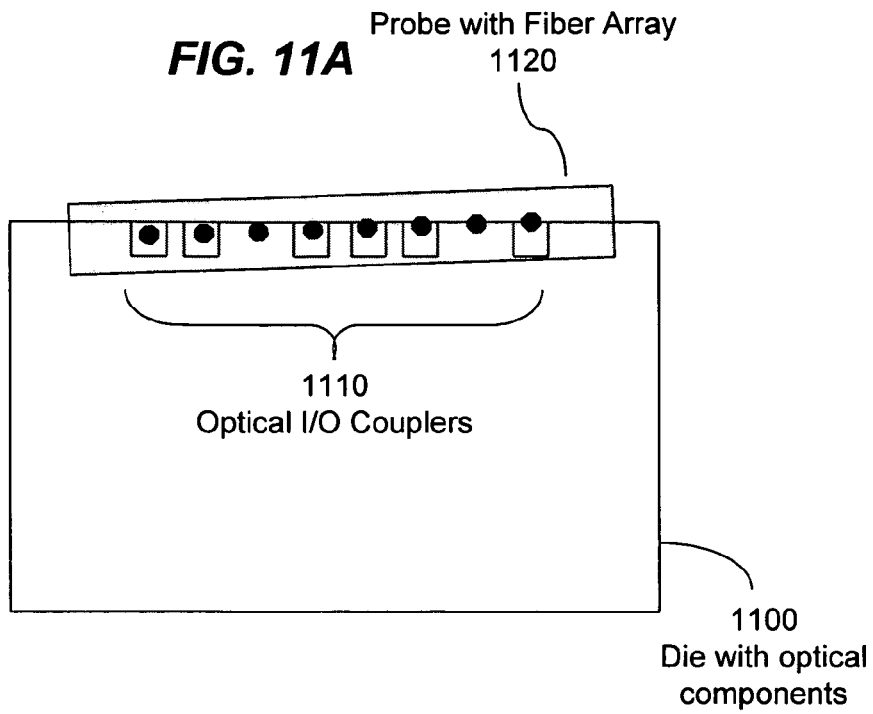
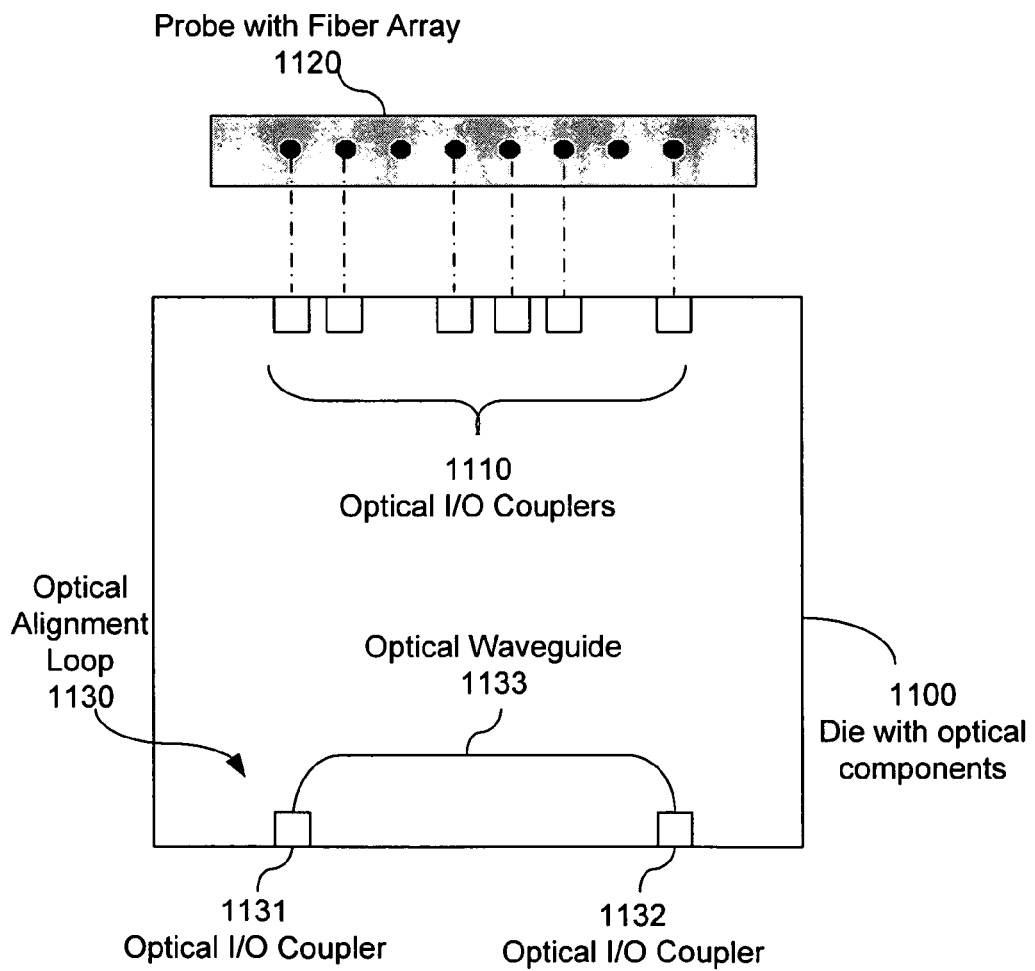

Control the wafer positioner to move the relative position of the optical probe from the known location at one optical reference mark to an optical port of a selected optical component in the selected die according to a predetermined position map to obtain an output response from the selected die caused by probe light received by the optical port

↓

While maintaining the wafer positioner fixed in position, adjust the position of the optical probe according to a fine alignment algorithm to maximize the output response

↓

Fix the relative position of the optical probe with respect to the selected optical component where the output response is maximal

↓

Perform a predetermined test on the optical component

↓
FIG. 15C

WAFER-LEVEL TESTING OF OPTICAL AND OPTOELECTRONIC CHIPS

This application claims the benefit of U.S. Provisional Application No. 60/461,041 entitled "Reflective structures for fiber positioning and alignment on an integrated optical circuit with surface emitting/receiving optical devices" and filed on Apr. 7, 2003. The disclosure of the above provisional application is incorporated herein by reference in its entirety as part of this application.

BACKGROUND

This application relates to testing of integrated optical devices, integrated optoelectronic circuits and systems.

Compact optical components, devices, and systems may be monolithically fabricated on various substrates to form integrated optical components, devices, and systems. Such fabrication may be achieved using various fabrication processes to process wafers, including micro fabrication processes used for fabricating integrated circuits (ICs), microelectromechanical systems(MEMS), and other microstructures. The integrated optical components, devices, and systems may be monolithically integrated with ICs, MEMS, and other microstructures on the same chip to provide various useful functions. Fabrication of such integrated devices with optical components or devices generally includes wafer-level fabrication processes and packaging after dice on a single wafer are separated into chips by, e.g., dicing or sawing. The individually packaged chips are then tested.

In fabrication of integrated electronic circuits, a portion of the IC testing can be performed at the wafer level prior to separation of the dice. This wafer level testing measures the performance or identifies defective components and dice. Hence based on such testing at the wafer level, defective dice may be removed from subsequent processes including the packaging and testing of individual chips. Labor and costs associated with subsequent processes for the defective dice, therefore, can be significantly reduced. Various wafer-level testing systems have been developed for testing ICs at the wafer level.

SUMMARY

This application describes, among others, exemplary designs of wafer layouts with dice for chips having at least one integrated optical component, and associated testing systems and techniques for testing such chips at the wafer level. In the described exemplary implementations, wafers are designed with one or more optical alignment features or structures alongside the components and devices of the chips that are easier to find or locate by optical means than an optical component or device to be tested. Each of the optical component or device, and the optical alignment structure or structures may be optically accessed from a position above the wafer so that optical alignment and testing can be performed at the wafer level prior to separating the wafer into individual chips. In addition, as part of the wafer design, each optical alignment feature or structure has a known, predetermined positional relationship with one or more optical components or devices to be tested. Therefore, the optical component or device to be tested can be found by first optically locating a nearby optical alignment mark and then using the known positional relationship between the optical alignment mark and the optical component or device to accurately locate the optical component or device. Next, optical testing of the optical component or device can be performed at the wafer level.

The wafer level testing of optical components and devices can identify defective optical components and associated host dice at the wafer level. Therefore, defective dice may be removed from subsequent fabricating processes including the packaging of separated dice into chips and testing of individual chips. In this regard, the wafer level optical testing can spare the labor and costs associated with subsequent processes for the defective dice. In addition, certain optical testing procedures, which are conducted during testing individual chips in other chip fabrication and testing methods, may now be performed at the wafer level prior to separating the wafer into individual dice. The wafer level optical testing may be automated and systematically performed at a high speed. Therefore, the wafer level optical testing may be used to reduce the testing at the chip level and hence reduce the testing time, labor, and associated cost. Furthermore, the optical alignment and testing techniques described here may be used for attaching fibers to optical ports on wafers and chips after the proper alignment is achieved between an optical port on the chip and a fiber to be bonded to the optical port.

In one implementation, a probe beam from an optical probe located above the surface of a wafer is directed to the surface of the wafer. An optical alignment structure on the wafer is used to direct a portion of the probe beam along a direction above the wafer. The portion of the probe beam from the optical alignment structure is used as a guide to adjust the position of the optical probe relative to the optical alignment structure.

Based on the above implementation, a known spatial relationship between the positions of each component on the wafer relative to the optical alignment structure may be used to align the optical probe with at least one optical component on the wafer. After this alignment, the probe beam from the optical probe is used to optically test the optical component.

In another implementation, a device is described to include a wafer having a wafer surface patterned to comprise an integrated component and an optical coupler operable to couple light incident from a device above the wafer to the integrated component. The device also includes at least one optical alignment structure on the wafer surface operable to reflect incident light along a predetermined direction above the wafer surface.

System implementations for the wafer level optical testing are also described. For example, one described system includes a wafer holder, a wafer positioner, an optical probe, an optical probe positioner, and a system control. The wafer holder is used to hold a wafer comprising dice pattered to include optical devices and optical alignment marks that reflect incident light. The wafer positioner is engaged to the wafer holder to control positions and orientations of the wafer. The optical probe is used to deliver a probe beam to the wafer at an incident direction above the wafer and to receive optical reflection of the probe beam from the wafer. The optical probe positioner is engaged to the optical probe to control the position of the optical probe. The control system is used to control the wafer positioner and the optical probe in aligning the optical probe to a selected position on the wafer according to reflection of the probe beam from the optical alignment marks.

In another implementation, an optical probe head is provided to include an array of optical waveguides and to be positioned above a wafer. At least one optical waveguide in the array is used to direct a probe beam to the wafer which directs at least a portion of the probe beam back to the array. One of the optical waveguides in the array is used to receive the portion of the probe beam. The received light in the one of the optical waveguides is used as at least one of (1) a guide to adjust a position of the optical probe head relative to a position on the wafer to align different waveguides to different predetermined positions on the wafer and (2) a monitor signal to test an optical component on the wafer.

These and other implementations, their variations, applications, and associated advantages and benefits are described in greater detail in the attached drawings, the detailed description, and the claims.

BRIEF DESCRIPTION OF THE DRAWINGS

FIGS. 3A and 3B show operation of optical couplers in the terminal ports of optical components or devices in FIG. 2.

FIG. 3C illustrates light exiting a fiber probe used in FIGS. 3A and 3B in interaction with a flat surface on a wafer where the angled facet and the tilting of the fiber probe prevents the reflection and scattering of the light from entering the fiber probe.

FIGS. 10, 11A, 11B, and 11C show an optical probe with an array of fibers and optical alignment of the array of fibers using various optical alignment structures.

DETAILED DESCRIPTION

Figure 1:
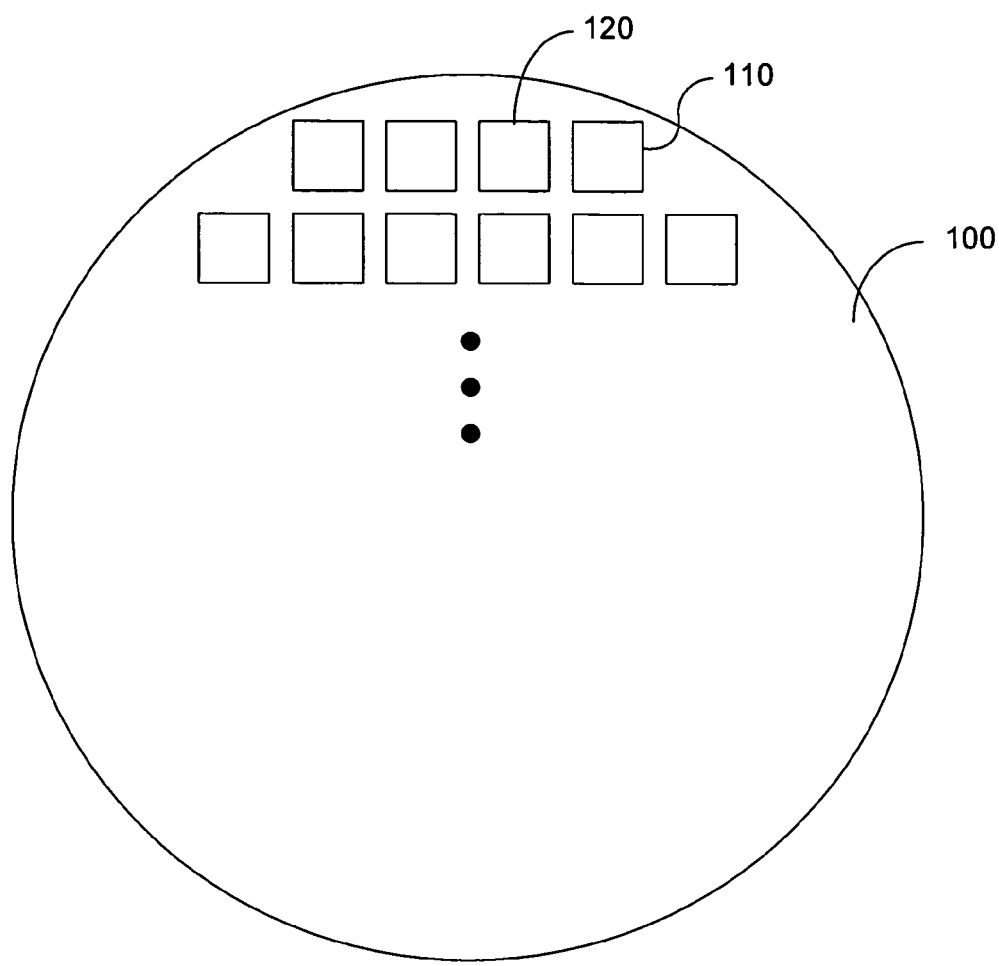
FIG. 1 illustrates a wafer patterned with microstructures in dice.

The wafers for implementations of testing techniques and systems described in this application may be made of various solid-state materials suitable for micro fabrication processes. Examples of substrate materials include semiconductor materials (e.g., silicon or GaAs), silicon-on-insulator materials, glass materials, and others. FIG. 1 shows an example of a wafer 100 that is patterned to include dice 110, 120, etc. Each die may include one or more micro structures. Each micro structure may be designed to perform one or more specific functions or operations. Examples of a microstructure include, but are not limited to, an optical component or device, an electronic component or circuit, a magnetic component or device, a mechanical component or device, an opto-electronic component or device, and a MEMS component or device. At least one die on the wafer 100 includes an optical component that is to be tested based on the wafer level optical testing described in this application. All dice on the wafer may be identical in some implementations. In other implementations, dice on the same wafer may be different. For example, although at least one die has at least one optical component integrated in the die, one or more dice on the same wafer 100 may not include an optical component, or alternatively, include one or more different optical components.

Figure 2:
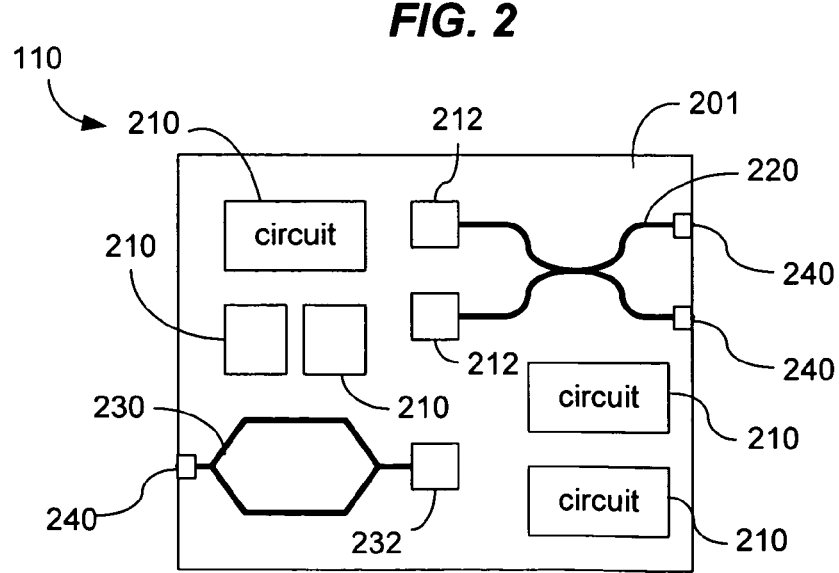
FIG. 2 shows one die in FIG. 1 that has optical components or devices.

FIG. 2 shows one example of the die 110 in FIG. 1 that has both optical and electronic components integrated within the die area 201. Alternatively, a die may be all optical. In this particular example, integrated circuits 210 are fabricated along with the optical components. One optical component is a 2×2 optical switch 220 having optically coupled waveguides. A control mechanism, e.g., one of the circuits 210, may be implemented to control the switching operation. The units 212 may be two optical transmitters to generate optical signals to be switched. Alternatively, the units 212 may be two detectors to receive optical signals.

The die 110 in FIG. 2 further includes a second optical component 230 illustrated as an optical Mach-Zehnder modulator formed with optical waveguides. The unit 232 on one terminal of the modulator 230 may be an optical detector to receive output of the modulator 230, or alternatively an optical transmitter to send an optical signal to be modulated by the modulator 230. The other terminal of the modulator 230 is an optical port 240 which includes an optical coupler as a vertical optical interface.

An optical component or device on the die 110 may be optically passive or active, and may be implemented in a variety of configurations. Examples include but are not limited to an optical switch, an optical modulator, an optical detector, an optical splitter, an optical wavelength-division multiplexer or demultiplexer, an arrayed waveguide grating, an optical amplifier, an optical transmitter, an optical attenuator, an optical filter, an optical resonator, an optical interferometer, etc.

Notably, the die 110 includes optical ports 240 that are located at predetermined positions and operate to input or output optical signals. In some implementations, an optical port may be located at or near an edge of a die on the wafer. In other implementations, an optical port may be located away from an edge of a die. For example, FIG. 2 shows that all of the optical ports 240 are located on or near one or more edges of a die. In certain applications, some optical ports may be located at or near an edge of a die and at least one of the optical ports 240 may be located away from an edge within the die. Each optical port 240 is located at a terminal end of a waveguide or an optical device on the die 110 and includes an optical coupler for coupling light into the waveguide or device from the top of the die 110 or coupling light out of the waveguide or device and directing the light to the top of the dice 110. This optical coupler may be designed to couple light incident to the coupling port from a light source, a waveguide or fiber positioned above the die 110. The incident light may be in a direction with a predetermined fixed incident angle with respect to the normal direction of the wafer surface of the die 110. In one implementation, for example, the incident light may be at a direction with a fixed acute angle with respect to the normal direction of the wafer surface, such as an angle of several degrees. In another implementation, the incident light may be at a direction substantially perpendicular to the wafer surface.

Conversely, each optical coupler within a port 240 may also be operated to couple output light from the waveguide or device on the wafer as an output light beam towards the top of the wafer surface at a predetermined output angle with respect to the normal direction of the wafer surface. For example, the output angle may be at an acute angle with respect to the normal direction of the wafer surface or may be substantially perpendicular to the wafer surface.

Such optical couplers allow for an external optical unit located above the die 110 or the wafer 100 to optically interface with optical waveguides, optical components or optical devices on the die 110 or the wafer 100. The external optical unit located above the die 110 or wafer 100 may be, for example, an optical waveguide or an optical fiber having an end facet that receives light from or directs light to an optical coupler on the die 100. This external optical unit may include multiple fibers or waveguides for sending light to and receiving light from the die or wafer. The multiple fibers or waveguides may form a 1- or 2-dimension array. In these and other implementations of optical coupling through the top of the die 110 or wafer 100, the individual die 110 need not be separated from the wafer 100 in order to perform an optical test on an optical component or device on the die 110. The die 110 and other dice on the same wafer 100 may be tested for their optical operations at the wafer level. The wafer level optical testing may be used to achieve a number of advantages, including early identification of defects in optical components and devices and thus defective dice, automated testing at the wafer level, reduced testing costs and time, and savings in labor and time associated with packaging and testing at the chip level.

FIGS. 3A and 3B illustrate two modes of operation of the optical coupler within an optical port 240 described above. In FIG. 3A, the coupler 240 operates as an input coupler to a waveguide or an optical device on one of the dice on the wafer 100. A beam incident from the top of the wafer surface is directed into the coupler 240. The coupler 240 receives the incident beam and redirects the incident beam in a direction substantially parallel to the wafer surface into an associated waveguide or device on the wafer 100. The coupler 240 may be implemented in various forms. For example, a grating coupler may be used as the coupler 240 to redirect the beam by optical diffraction. FIG. 3B illustrates the operation of the coupler 240 as an output coupler where an output beam from the waveguide or device generally parallel to the wafer surface is redirected by the optical coupler 240 to the top of the wafer surface in a predetermined direction.

In both FIGS. 3A and 3B, a single fiber is illustrated as a fiber probe and represents one specific example for the external optical unit above the wafer surface that optically communicates with an optical component or device on the wafer 100. Such a fiber may be a single-mode fiber, a polarization maintaining fiber, or a multi-mode fiber. With a properly designed grating coupler as the coupler 240, the fiber probe may be used to guide and direct a probe beam from the top of the wafer 100 into the coupler 240 and to receive output light from the coupler 240 through a fiber end facet of the fiber. The fiber may have an angled end facet that is positioned above the wafer surface. The fiber probe may direct light to the wafer at a small angle with respect to the normal direction of the wafer surface, or may receive light output from the wafer at the small angle, or may both direct light to the wafer and receive light from the wafer along the direction with this small angle. Hence, a probe beam from a light source can be delivered through this fiber to the die 110 and an output from the same optical coupler 240 may be directed back to the fiber for optical detection or diagnosis. The light used with the optical probe may be at a suitable spectral range for the intended applications, such as the near infrared range including but not limited to wavelengths at or near 850 nm, 980 nm, 1150 nm, 1310 nm, 1480 nm, and 1550 nm.

The fiber shown in FIGS. 3A and 3B is one example of the external optical unit above the wafer surface that optically communicates with an optical component or device on the wafer 100. This external optical unit above the wafer surface may be implemented in various ways. As described in later sections of this application, multiple fibers such as one or more arrays of fibers or a bundle of fibers may be used in some implementations to simultaneously couple multiple probe beams into a die and to receive multiple output beams from the die. A light source or an array of light sources such as diode lasers (e.g., VCSELs) and LEDs may be directly placed above the wafer surface to direct probe light to the wafer surface. A single or an array of optical detectors may be placed above the wafer surface to receive light coupled out of the wafer surface for testing. Certainly, a combination of two or more above and other optical components may be used as this external optical unit above the wafer surface for the wafer level testing.

In the example illustrated in FIGS. 3A and 3B, the fiber probe may be oriented to be slightly off the normal direction of the wafer surface so that the output light from the fiber probe exiting at the angled end facet is incident to the wafer surface at an angle to prevent specular reflection of the incident light from the wafer surface from hitting the angled end facet and entering the fiber probe. FIG. 3C illustrates a situation where the incident probe beam from the fiber probe hits a flat surface or a location other than an optical port 240 having a grating coupler. In absence of the diffraction by the grating coupler, the incident probe beam is reflected into a main reflection based on the specular reflection and possibly weak secondary reflections. Tilting the fiber probe allows the reflection to be directed away from the end facet of the fiber probe. In one implementation, for example, the fiber probe with an angled end facet may be set at about 8 degrees from the normal direction.

This mechanism for preventing reflection of incident probe light from returning to the fiber probe in part facilitates the use of the fiber probe to receive output light from an optical component or device on the wafer via a grating coupler 240 and the optical alignment of the optical probe using optical alignment marks, features, or structures described in this patent application. For example, in some implementations, the grating coupler in the optical port 240 shown in FIGS. 3A and 3B may be designed to direct output light to the fiber probe or an optical alignment mark on the wafer may be designed to direct input light back to the angled fiber probe along the original input path by using a diffraction grating such as a Littrow grating. Therefore, unless the fiber probe is positioned above the wafer 100 at or near an optical port 240 or an optical alignment mark, the fiber probe ideally does not receive strong light from reflection from the wafer surface. This application provides some examples of using received light from an optical port 240 for optical detection or alignment of the fiber probe and examples of using received reflection from an optical alignment mark for alignment of the fiber probe.

A die on the wafer 100 having an electronic component may have input and output electrical contact pads located at, e.g., near edges of the die. Testing of such electronic components may also be included in the wafer level testing described here and may be performed either simultaneously or at a different time with the optical wafer level testing. The locations of the contact pads and optical couplers 240 may be designed to accommodate simultaneous optical and electronic testing in some chips so that the optical probe and electronic probe(s) do not interfere with each other. For example, an optical detector connected to an I/O port 240 with a grating coupler is tested with an optical input and an electrical output. As another example, an electrically controlled optical modulator has at least one electrical input, one optical input and an optical output. Such a modulator is tested with both electrical and optical probes.

In the examples shown in FIGS. 3A, 3B, and 3C, a fiber collimator lens may be included in the fiber facet. In an implementation, where one fiber is used to deliver a probe beam to the wafer and a separate fiber is used to receive the reflected or output beam from wafer, such a fiber collimator lens may be used to improve the collection efficiency of the fiber for receiving light.

Figure 4:
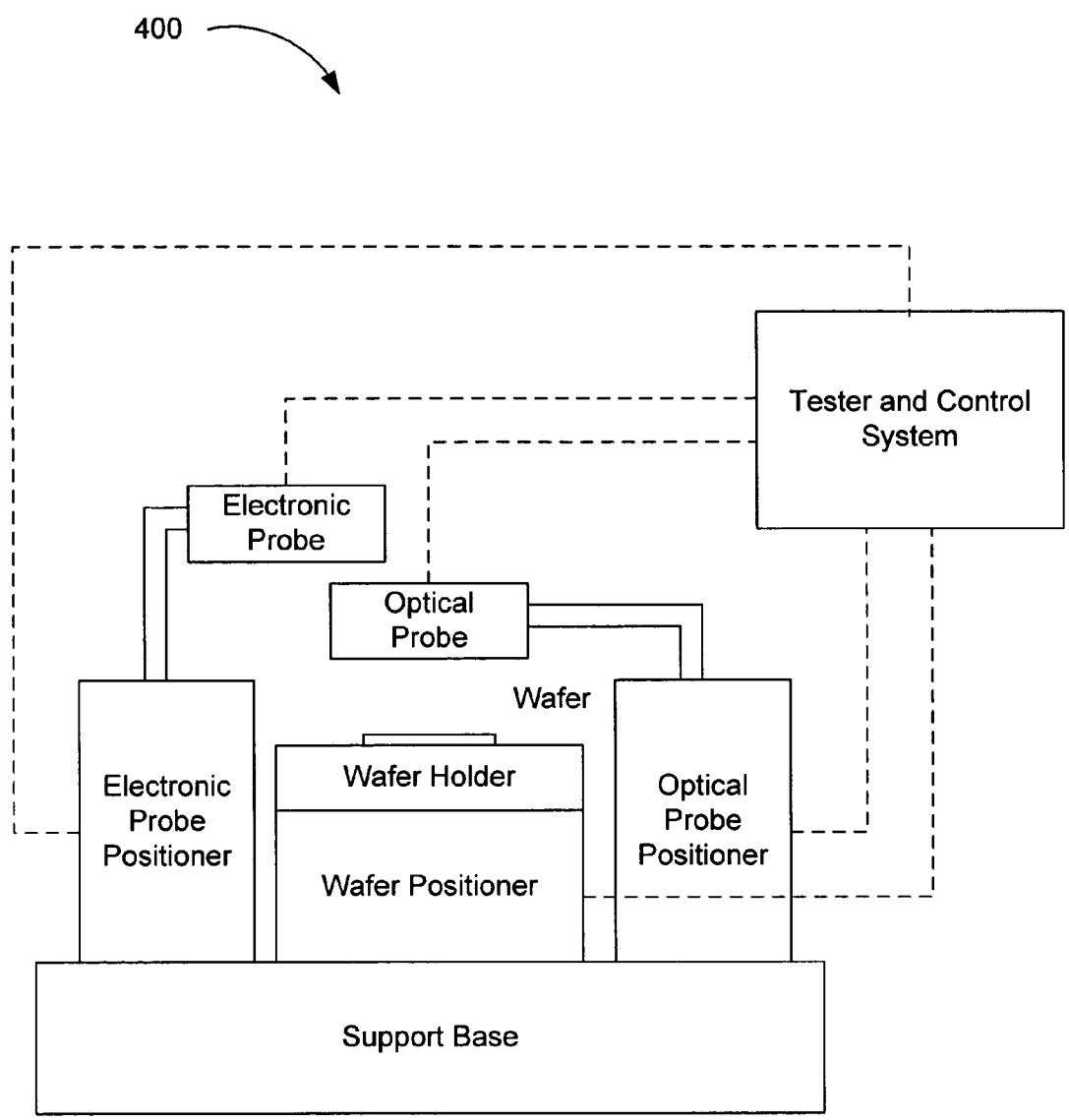
FIG. 4 shows an example of a wafer-level testing system.

FIG. 4 illustrates one exemplary implementation of a wafer-level testing system 400 for testing wafers like the wafer 100 in FIG. 1 prior to separation of the dice. This system 400 may also be used to test diced wafers. The testing system 400 includes a support base that holds a wafer positioner, an electronic probe positioner, and an optical probe positioner. The wafer positioner supports a wafer holder or chuck configured to hold a wafer under test and has positioning mechanisms to adjust and control the lateral and vertical positions, and orientations of the wafer under test. The wafer positioner operates to move the wafer to position a selected die under test at a predetermined fixed position at which electronic and optical tests are conducted. The wafer positioner further operates to position components within the selected die under test at desired positions relative to the optical or electronic probe for testing.

The electronic probe positioner is used to hold and position an electronic probe above the wafer for testing electronic, optoelectronic, or electro-optical components in a die on the wafer. The electronic probe may be an RF or DC probe with one or more electrically conductive tips or needles as the contact leads. The electronic probe may include one or more electronic contact leads for supplying one or more testing electronic signals to the die and receiving one or more output electronic signals from the die. An electronic signal output from the die may be generated in response to light, e.g., an optical detector on the die. An electronic probe card with multiple contact leads, e.g., may be used for testing the electronic components. The electronic probe positioner may be controlled manually by an operator or automatically by a motorized control mechanism. The electronic probe positioner may be used to provide fine position adjustments to the electronic probe within a die area to ensure a proper alignment between the testing contact leads and the contact pads on the die for testing.

The optical probe positioner holds an external optical unit such as an optical probe at an approximate position above the wafer or a diced die for performing optical testing. As an example, the optical probe may include one or more optical probe heads that deliver one or more probe beams from the top of the wafer to the wafer at a predetermined height above the wafer surface. The optical probe may also include one or more optical probe receivers to receive output light beams coming out of the wafer surface. An optical waveguide may be used as the optical probe receiver, the optical probe head, or both, e.g., the optical fiber probe illustrated in FIGS. 3A and 3B which may be held in a V-groove in a substrate or a waveguide fabricated in a substrate.

For optical testing, the wafer positioner is used to adjust the lateral and vertical positions of the wafer to an initial position under the optical probe. The wafer positioner may include a translational positioner or a combination of translational positioners to control the lateral positions and the vertical position of the wafer held on a chuck. For the lateral control, for example, two one-dimensional positioners may be combined to provide adjustments in two orthogonal lateral directions X and Y. A third one-dimensional positioner may be used to control the vertical position Z of the wafer. The wafer positioner may further include a yaw adjustment to adjust the orientation of the wafer around the vertical axis Z. The wafer positioner may be designed to have two predetermined fixed vertical positions, a "testing position" and a lower "separate position" for controlling the vertical positions of a wafer. At the lower separate position, the wafer positioner separates the wafer from the electronic probe and the optical probe. At the testing position, the wafer positioner raises the wafer to be in contact with the electronic probe and close to the optical probe with a desired spacing in the vertical direction so that either or both of electronic testing and optical testing may be conducted at this position. After the wafer positioner sets the wafer at the testing position, the electronic probe positioner can be used to adjust the vertical position of the electronic probe to contact the wafer for testing. The optical probe positioner may be adjusted to finely tune the lateral positions (X and Y) of the optical probe and the relative vertical spacing between the optical probe and the wafer at a predetermined distance for the optical testing. The optical probe positioner may also be used to finely tune the yaw angle of the optical probe, for example when the optical probe is a linear array of fibers.

The accuracy of many commercial wafer positioners, however, may not be sufficient for properly aligning an I/O optical coupler 240 to the optical probe for optical testing in part because optical alignment in optical testing demands higher alignment accuracy. For example, an optical fiber end facet in the optical probe may need to be aligned to an input or output optical coupler 240 with a lateral tolerance of about one micron or less in various applications. This accuracy is difficult to achieve in many commercial wafer positioners in wafer testing systems designed for testing electronic circuits only. Hence, the system 400 implements the optical probe positioner to finely adjust the position and orientation of the optical probe relative to the wafer under test to optimize the optical alignment. As an example, a PZT-driven precision piezo positioner with a displacement range of about 100 microns may be implemented as part of the optical probe positioner for fine adjustment of position, and a combination of a rotation stage for yaw orientation and a manual pitch/roll stage may be used for fine adjustment of orientation. Such an optical positioner provides up to six degrees of freedom in adjusting the position and orientation of the optical probe relative to the wafer.

The system in FIG. 4 may include two separate optical probes held by two different optical probe positioners. As an example, one optical probe may include at least one fiber to send probe light to the wafer and the other optical probe may include a fiber to receive reflected probe light or light output from an optical I/O port 240 on the wafer. Additional optical probes may also be added when needed. Two or more electronic probes may also be included in the system in FIG. 4.

In FIG. 4, a tester and control system is shown in the system 400 to control the system operations and tests. This system may include one or more micro processors or computers and other electronics for carrying out various processing and control operations. For a given design of die patterns on a wafer, a position map may be generated from the given design in which each component, optical, electronic, or otherwise, is registered and represented by position coordinates. The data for this position map may be made available to the tester and control system by, e.g., being stored in an internal memory or disk of the system or a portable memory media or device. The wafer positioner may be controlled according to this map to move any die and any component within the die to the fixed position under the optical probe for testing. The electronic probe positioner may also be controlled based on this map to align the electronic contacts between the electronic probe and the die on the wafer.

The tester and control system in FIG. 4 may include testing functions for testing the electronic and optical components. This part of the system may include one or more electronic signal sources for generating desired electronic probing signals, electronic interfaces for outputting and receiving electronic signals, and testing analyzers for performing the testing. For optical testing, this part of the system may include one or more light sources for producing probe light to the wafer, one or more optical receivers for receiving optical signals from the wafer and converting into electronic signals, and optical testing analyzers for performing optical testing. With at least one electronic probe and one optical probe, the system in FIG. 4 may perform optical testing, electronic testing, and optoelectronic testing on a chip or a wafer mounted on the wafer positioner. The optical testing, electronic testing, and optoelectronic testing may be conducted at the wafer level prior to dicing the wafer into chips.

Optical alignments for optical testing in the system in FIG. 4 may need an alignment accuracy higher than that for aligning electronic pads for electronic tests. The tester and control system in FIG. 4, thus, may be designed to include fine alignment control mechanisms to achieve such accuracy not readily available from many wafer testing systems designed for testing electronic IC chips or electronic devices, components, and circuits. The entire optical alignment control mechanism of the system in FIG. 4 is implemented in different parts of the system and these different parts operate in combination with one another. The following describes exemplary implementations of the optical alignment mechanisms in the system 400 in connection with optical alignment structures such as alignment marks or optical devices that are designed and fabricated on wafers. Various alignment features and mechanisms in the system 400, including coarse optical alignment control for the wafer positioner, and fine optical alignment control for the optical probe positioner, may be used to fully explore the benefits of such optical alignment structures on the wafers as described in greater detail below. It is understood that various alignment features and mechanisms in the system 400 may also be used for optical alignments for optical testing, including wafer-level optical testing, based on other optical alignment techniques without such optical alignment structures on the wafers.

In the examples described below, an optical alignment structure on a wafer may be an optically reflective or diffractive structure that directs the majority or all of light energy in an optical probe beam incident from above the wafer to a predetermined output direction above the wafer. This optical output from the optical alignment structure may be collected at a position above the wafer by an appropriately designed optical probe positioned above the wafer. The received light from the optical alignment structure may be used as a guide or indicator to align the position of the optical probe with reference to the optical alignment structure. The use of a single optical alignment structure on the wafer may be sufficient to align the optical probe. In some implementations, more than one alignment structures on the wafer may be used in combination to achieve the desired optical alignment and to improve reliability and accuracy of the optical alignment. In some implementations, after the optical probe is aligned with reference to at least one optical alignment structure, the optical probe may be moved relative to the wafer to align with a target optical device such as an optical coupler in an optical I/O port 240 described above. This alignment step may be achieved according to a known relative positioning relationship between the optical alignment structure and the target optical device.

Figure 5:
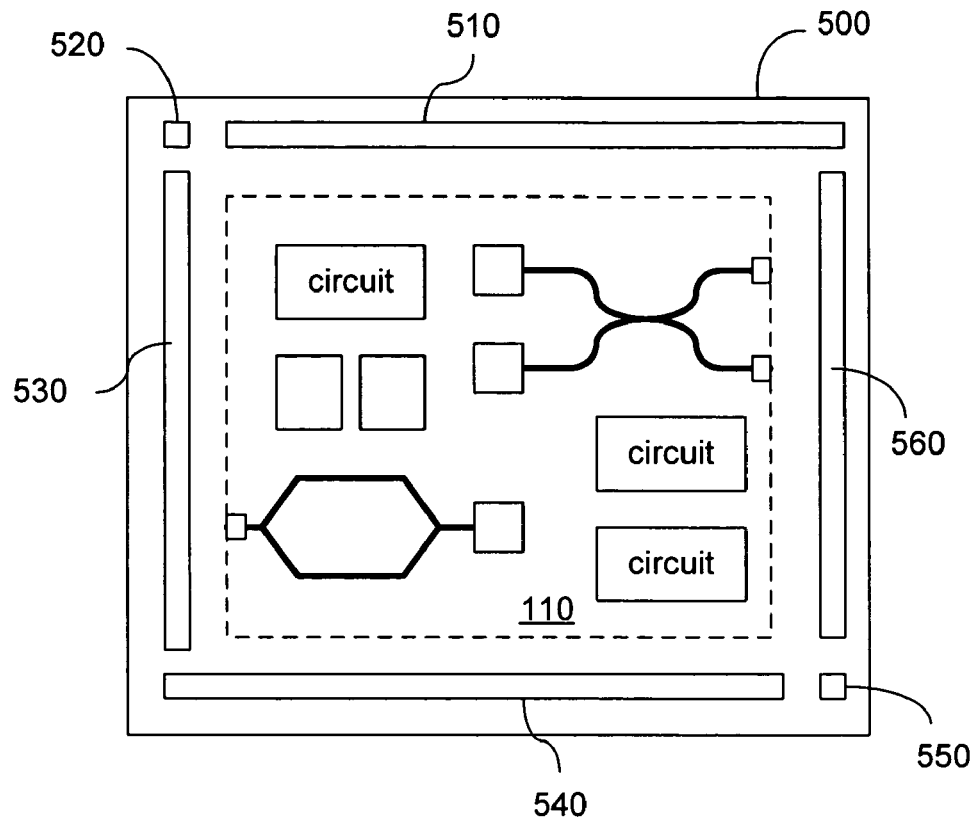
FIG. 5 shows examples of optical alignment structures in the form of dot and line optical alignment marks in a wafer.

FIG. 5 shows one example of a wafer 500 that is fabricated with optical alignment marks as the optical alignment structures used in optical testing. A portion of the wafer 500 is illustrated to include the exemplary die 110 shown in FIG. 2, and optical alignment marks 510, 520, 530, 540, 550, and 560 surrounding the four sides of the die 110. Each alignment mark is designed to be optically reflective to reflect an incident optical beam from the top of the wafer back to the top of the wafer either in its original optical path or in a different but predetermined direction so that the reflected light can be collected by the optical probe positioned above the wafer 500 and analyzed for optical alignment.

Each optical alignment mark may be designed to reflect incident light back in a retro reflection mode or to reflect light to a predetermined known direction. In the latter non-retro-reflection design, a separate optical receiver positioned above the wafer 500 may be used to receive and collect the reflected probe beam for optical alignment. When each optical alignment mark is retro reflective, an optical probe can use the same optical waveguide such as a fiber that delivers the probe beam to the wafer 500 to collect the reflected probe beam to an optical detector coupled to the optical waveguide. The optical reflection of an alignment mark is designed to be much stronger than optical reflection or scattering at other parts of the wafer 500. Under this design, the reflection from an alignment mark indicates whether the probe beam hits an alignment mark and the strength of reflection indicates whether the optical probe is properly aligned with reference to the optical alignment mark.

Figure 6A:
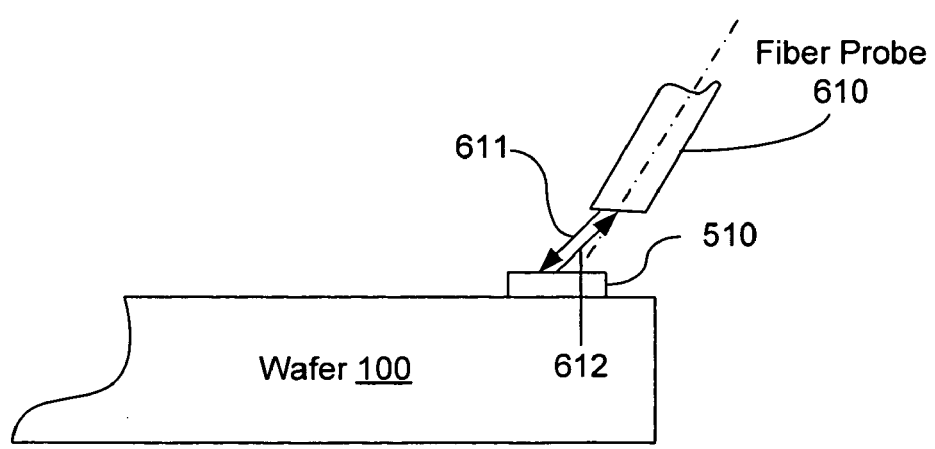
FIG. 6A illustrates optical operation of an optical alignment structure in FIG. 5 according to one implementation.

FIG. 6A illustrates an alignment in connection with the wafer 500 in FIG. 5 where a single fiber probe 610 positioned above the wafer 500 is used to both direct a probe beam 611 and to receive a reflected probe beam 612 from the wafer 500. In this specific illustration, the fiber probe 610 is under alignment with the optical alignment mark 510. The optical alignment mark 500 receives the probe beam 611 from the fiber probe 610 and reflects the probe beam back to the fiber probe 610 as the reflected probe beam 612. The fiber probe 610 collects the reflected probe beam 612 and delivers it to an optical receiver used in the optical alignment control. At a given height, the relative lateral position between the mark 510 and the fiber probe 610 is adjusted to maximize the received optical power of the reflected probe beam 612.

Figure 6B:
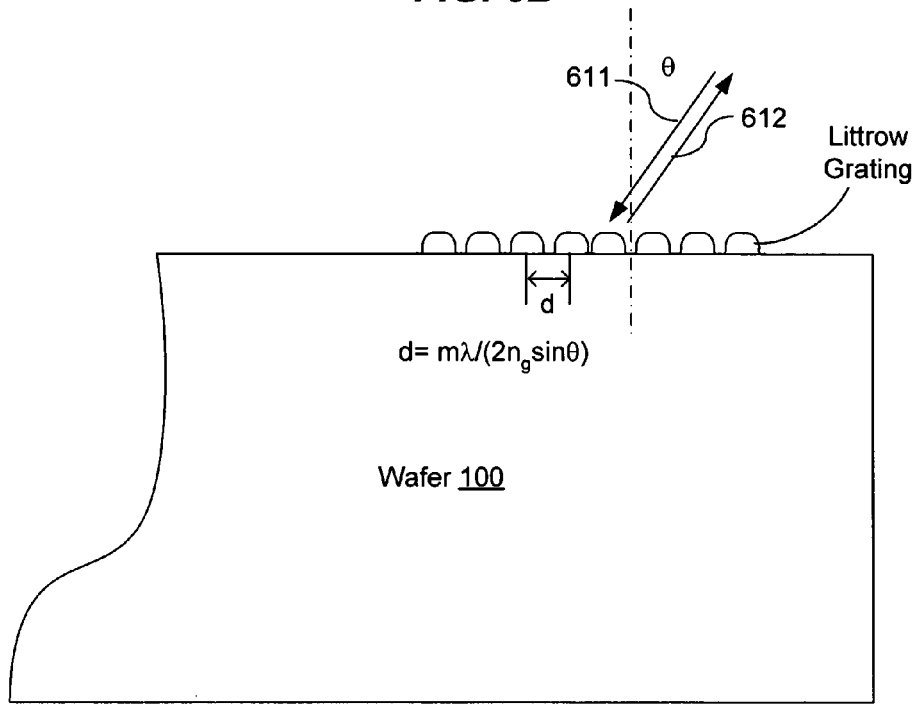
FIG. 6B shows a Littrow grating as one exemplary implementation of an alignment structure.

FIG. 6B shows one exemplary implementation of the optical alignment marks used in FIG. 5 where an optical diffraction grating structure such as a Littrow grating may be used as the reflective alignment marks. The Littrow grating as the alignment structure operates to produce a retro reflection under the Littrow condition of $d=m\lambda/(2n_g \sin \theta)$ where m is an integer for the diffraction order, $n_g$ is the effective index in the fiber probe, and $\theta$ is the angle of the fiber probe with respect to the normal direction of the wafer surface. A Littrow grating may be directly fabricated on the wafer 500.

In designing the wafer 500 with alignment marks, the positions of the alignment marks are predetermined and are known. In addition, the relative positions of each component within each die with respect to the optical alignment marks are known. These positional relationships are included in the position map. Hence, the alignment system may use the known location of at least one alignment mark to align the optical probe to that alignment mark and then use the alignment mark as the reference to move the wafer to place a selected I/O optical port 240 for an optical component under the optical probe.

The shape and location of an optical alignment structure for a die may be designed to allow for unambiguous identification of a location on the die. A single optical alignment structure may be sufficient to define a reference location on the die. An optically reflective dot at a known reference location on the wafer, for example, may be used as an optical alignment mark.

The example shown in FIG. 5 uses a set of 2 alignment marks to achieve this unambiguous identification of a reference location on the die. The marks 510 and 520 form one set. The mark 510 is an elongated line mark that is spaced from die 110 and is parallel to one side of the die 110. The mark 520 is a dot mark located at the corner formed by the two adjacent sides of the die 110. The dot mark 520 is separated from but is aligned with the line mark 510. In this set, the dot mark 520 is the "defining" mark whose location is to be found by using the "referencing" line mark 510 as a guide leading to the dot mark 520 for convenience and ease of alignment because a line does not uniquely define a location but a dot does and a line is easier to find than a dot.

In operation, the wafer positioner is controlled to move the wafer to the fixed position so that a selected die is visually under the optical probe. With this initial position as a starting point, the wafer is moved along one axis to search for a strong optical reflection from an alignment mark until a reflection is received by the optical probe and is detected. As described previously with an example shown in FIGS. 3A, 3B, and 3C, the optical probe is designed to receive only retro-reflected light from an alignment mark or light from an optical port 240. A fiber probe with an angled end facet in a tilted position relative to the normal direction of the wafer surface may be used as illustrated in FIGS. 3A through 3C and FIG. 6A. Next, the wafer is moved around to determine whether the mark is a dot mark or a line mark. If the reflection is from a dot mark, the alignment with respect to the dot mark is finely adjusted and optimized by maximizing the reflection. If the reflection is determined to be from a line mark, the wafer is moved along the found reflection line until the reflection line ends and the strong reflection signal drops to the value close to zero. The design with dot 520 and line 510 represents the scheme in which the line mark 510 is used as a "runway" leading the system to the dot 520. Once the dot 520 is found, the system can use the position map to move wafer from the known location of the dot 520 to place the selected optical device or component under the optical probe.

There are additional three sets of alignment marks surrounding the remaining sides of the die 110 as shown in FIG. 5. The second set includes the dot 520 and the line mark 530, the third set includes dot 550 and the line 540, and the fourth set includes dot 550 and the line 560. These redundant sets of alignment marks are optional and may be used to further facilitate the optical alignment, especially when the wafer positioner has some inherent alignment inaccuracy in its movement. For example, three alignment marks may be used when the x, y, and z translational stages in the wafer positioner are not orthogonal to one another.

Figure 7A:
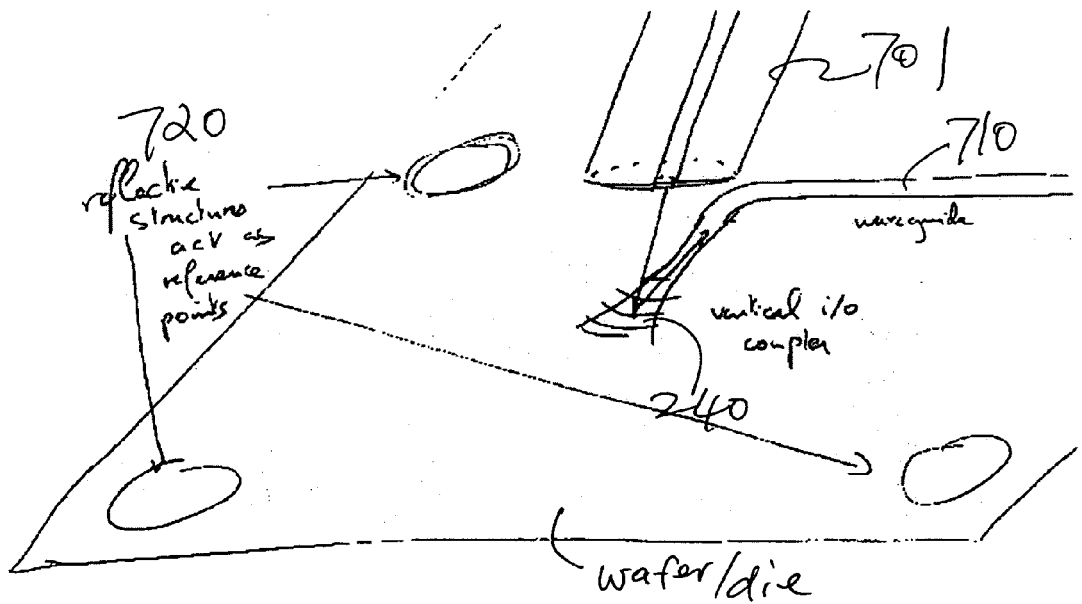
FIGS. 7A, 7B, 8A, 8B, 8C, 8D, and 9 show examples of optical alignment structures and their operations.
Figure 7B:
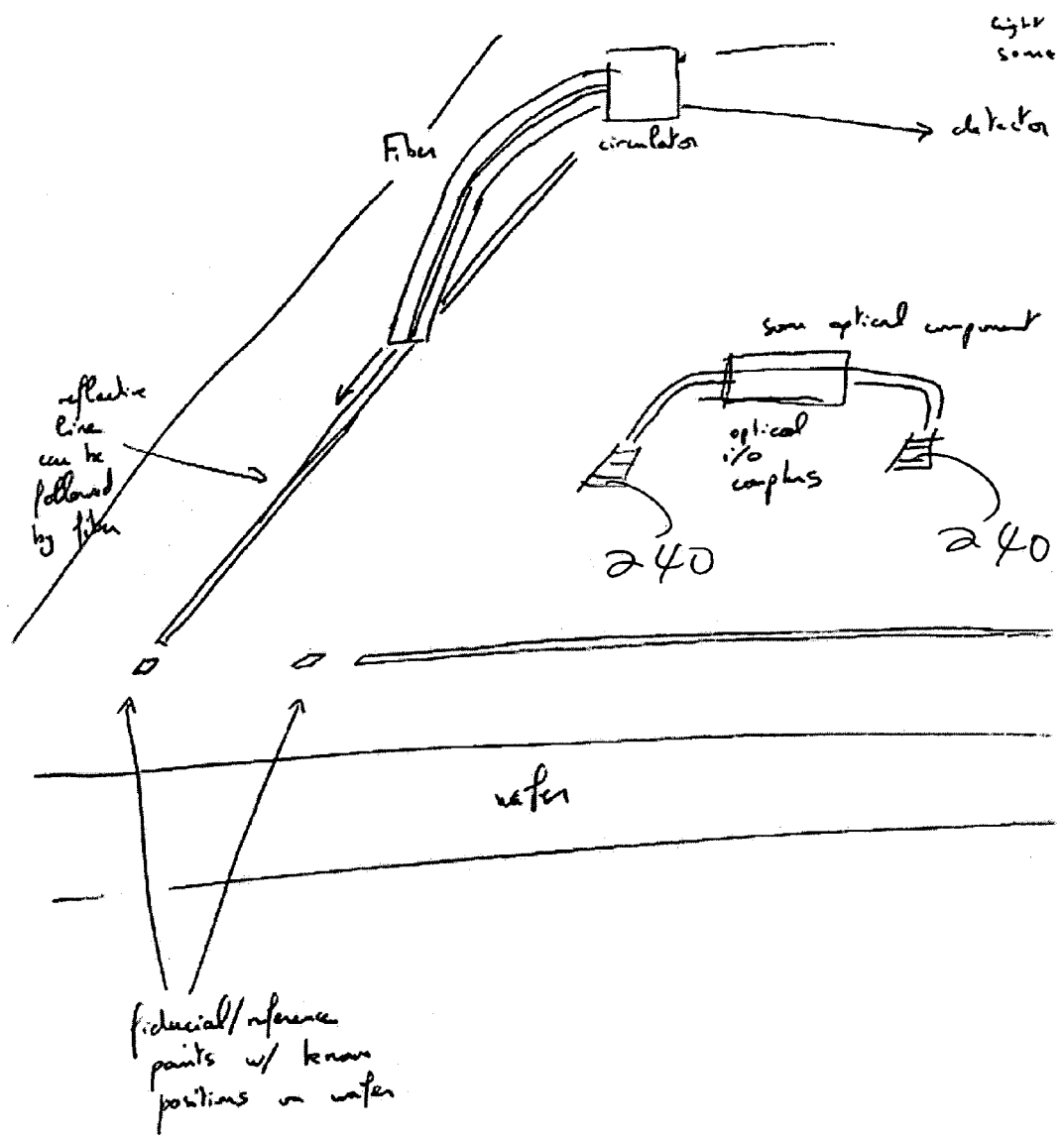

FIGS. 7A and 7B show two different examples of optical alignment marks for implementing automated optical alignment. In FIG. 7A, three reflective optical alignment dot marks 720 are formed on the wafer for aligning a fiber probe 701 to a grating coupler in an optical I/O port 240 connected to a waveguide 710. Depending on the specific design of each alignment mark, the light from the fiber probe 701 may be reflected back to the same fiber or to a different fiber by an alignment mark. The alignment marks or structures may be lithographically defined structures like reflective gratings, structures defined by material depositions such as a Bragg reflector made of various dielectric layers, or structures defined both lithography and by material deposition such as a metal layer patterned into small reflective structures and a set of metal layers patterned to form an effective angle surface. Spatial separation may be obtained by, e.g., designing a reflective structure that sends light into another fiber or a predetermined, known direction to be collected and measured. If an alignment mark or structure is retro reflective to send light back to the fiber probe 701, optical devices such as optical circulators, beam splitters, and directional couplers may be coupled to the other end of the fiber probe to properly route the outgoing and incoming optical signals. Interferometric techniques may also be used to improve the contrast of the optical measurements of light received from the wafer.

The use of optical gratings as the reflective alignment marks or structures may be used to make the alignment system sensitive to optical polarization. Hence, when a polarization maintaining (PM) fiber is used for delivering a probe beam to the wafer or receiving light from the wafer, the optical grating reflective alignment marks may be designed to allow for optimizing the orientation of the PM fiber based on the sensitivity to the optical polarization and to maximize the optical coupling.

FIG. 7B show another example where reflective optical alignment lines and dots in an arrangement different from the example shown in FIG. 5 based on a combination of line and dot alignment marks. The reflective alignment dots and lines are retro reflective and hence a single fiber probe is used to deliver the probe light and to collect reflected light. A light source and an optical detector are optically coupled to the other end of the fiber probe to respectively produce the probe light and to measure the received reflected probe light. An optical circulator is coupled between the other end of the fiber probe and the light source and the detector for routing the light from the light source into the fiber and received reflected probe light form the fiber to the detector. The output of the optical detector may be used to form a feedback control to the positioning mechanism so that high reflected power is maintained as the fiber is controlled to move on top of an alignment line mark. FIG. 7B further shows an optical component in the die that is connected through waveguides to two optical I/O ports 240 with grating couplers. After the fiber probe is aligned with respect to an alignment mark, it can be moved to align with one of the I/O ports 240 for optical testing.

Figure 8A:
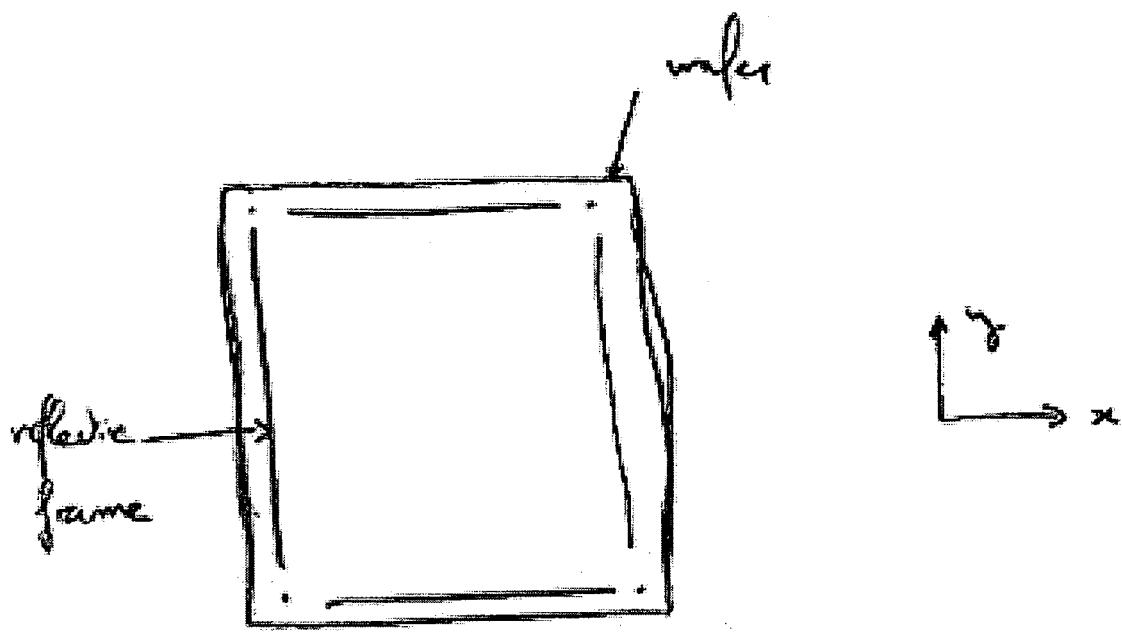
Figure 8B:
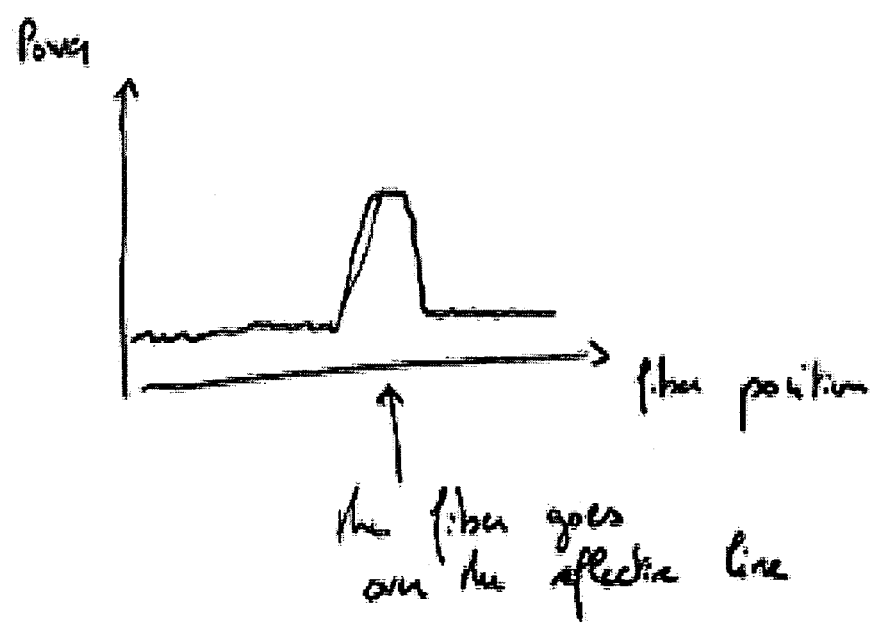
Figure 8C:
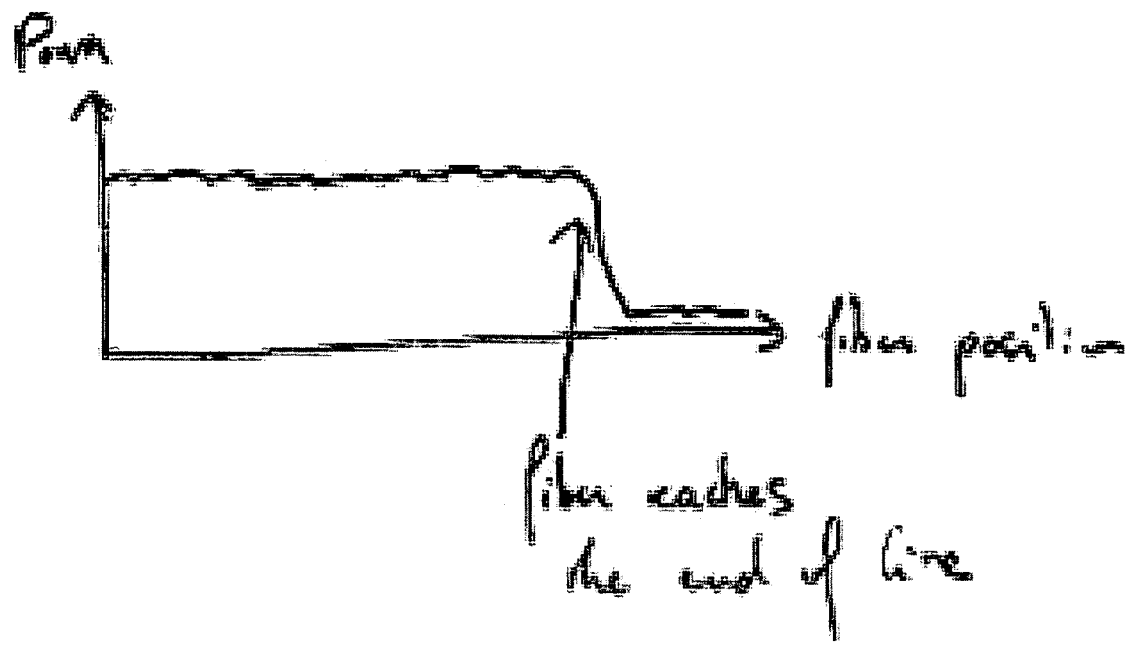
Figure 8D:
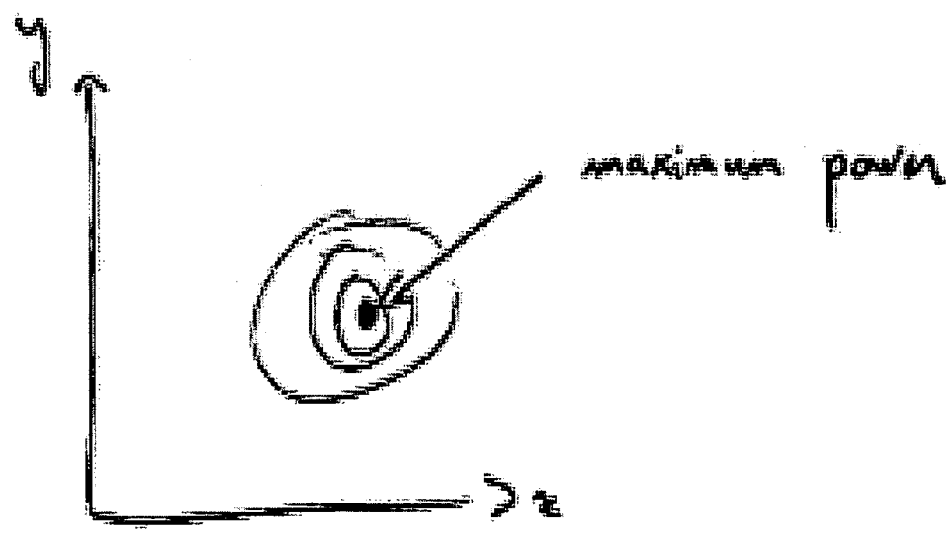

FIGS. 8A, 8B, 8C, and 8D show an implementation where an alignment algorithm may be used to automate the alignment process based on the alignment marks with minimal user intervention. The alignment marks have lines and dots on the four sides of a wafer as illustrated (FIG. 8A). The x and y axes of the wafer positioner are aligned with the x and y axes of the wafer. After the automated alignment process is initialized, the wafer positioner is adjusted to move the fiber probe relative to the wafer to search along one axis (e.g., the x axis) until a strong reflection is detected. FIG. 8B shows the power measurement during this step. Next, the fiber is brought back to a position where the reflected power was at or near the maximal power. Subsequently, the fiber position is moved along the y direction where the reflected power remains at the maximal value until the power drops. FIG. 8C illustrates this situation. Due to the arrangement of the dot and line marks in this example, this position indicates that the fiber in between an end of a line and a dot. Under this condition, the fiber is continuously moved along this direction until the reflected power is back again. At this point, the fiber is approximately above a dot mark. Next, a local search is performed to adjust the relative position between the fiber and the dot mark to find a position where the reflected power is maximized. FIG. 8D illustrates a circular search path around the dot mark for maximizing the reflected power. After the position for the maximum reflected power is found, the alignment with respect to this dot mark is completed. The above process can be repeated to align the fiber to other dot marks on the wafer.

Figure 9:
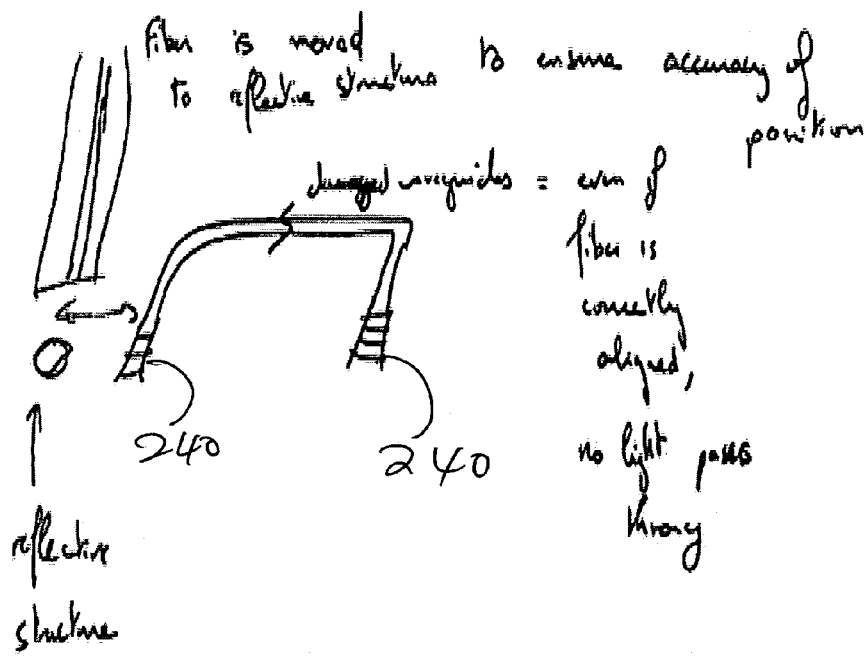

FIG. 9 shows another example for the alignment marks on a wafer where an alignment mark is purposely located near an I/O optical port 240 on the wafer with known positional offsets. Such an alignment mark is "local" to the corresponding optical port 240 and may be used in combination with the "global" alignment marks on the wafer, such as those shown in FIG. 8A. Such a "local" alignment mark or structure is useful when a particular nearby I/O optical port 240 may not be optically responsive due to some reason. For example, the optical device or the waveguide connected to the optical port 240 experiences large optical losses; the waveguide connected to that optical port 240 is damaged; that optical port is for receiving an optical input only; or the optical device connected to that port 240 has a response sensitive to the light wavelength and happens to fail to produce a detectable response at the probe wavelength. In such circumstances, a local realignment may be performed by using the one or more alignment marks near that optical port 240 that does not produce an optical output in response to the optical probe beam to ensure that the fiber probe is positioned at the right place, i.e., aligned with that optical port 240.

If the optical port 240 that does not itself produce an optical response to a received probe beam is connected to an optical detector or a device that produces an electronic signal in response to light received from that optical port 240, the electronic probe may be used to receive that electronic signal from the wafer as an output to assist the optical alignment between the optical probe and the optical port such as fine alignment in addition to the use of one or more "local" alignment structure near the optical port 240. The electronic output may also be used during the testing of the optical port 240 and the device that receives light from the optical port 240.

This use of both the electronic probe and the optical probe in alignment and testing may be applied to alignment and testing of various optoelectronic devices and components on the wafer. As an example, an optoelectronic component such as a LED or a laser diode may generate light in response to an applied electronic signal. The generated light may be directed to an optical port 240 which directs the light as an output above the wafer through the corresponding optical coupler therein. In this situation, the electronic probe may be used to supply the electronic signal and the optical probe may be used to receive the output light from the optical port 240 during the testing. In another example, an optical port 240 may be connected to an optical switch through a waveguide and the optical switch operates in response to an electronic control signal. Hence, both the electronic probe and the optical probe may be used in aligning and testing of the optical switch.

An optical probe for optical testing may include multiple fibers or an array of fibers that are designed to be respectively aligned with different optical components on a wafer for optical testing. Optical waveguides formed in a substrate may be used as an alternate to the multiple fibers or the fiber array. This use of multiple fibers/waveguides or a fiber/waveguide array in the optical probe allows for simultaneous testing of multiple ports and multiple optical elements on a die or a wafer. At least one of the fibers in the optical fiber probe may be dedicated for optical alignment with respect to an optical alignment structure which may be an optical alignment mark or an optical device for either alignment or some optical function on the wafer. Once the dedicated fiber for alignment is aligned with the optical alignment structure, all other fibers in the optical probe are also respectively aligned with their corresponding optical components on the wafer. A fiber array for an optical probe may a one-dimensional array or a two-dimensional array. A fiber in the fiber array may be a single-mode fiber, a polarization maintaining fiber, or a multi-mode fiber. The array may include one or more such fibers. As an example, a single fiber array may include a combination of the two or all three types of fibers.

Figure 10:
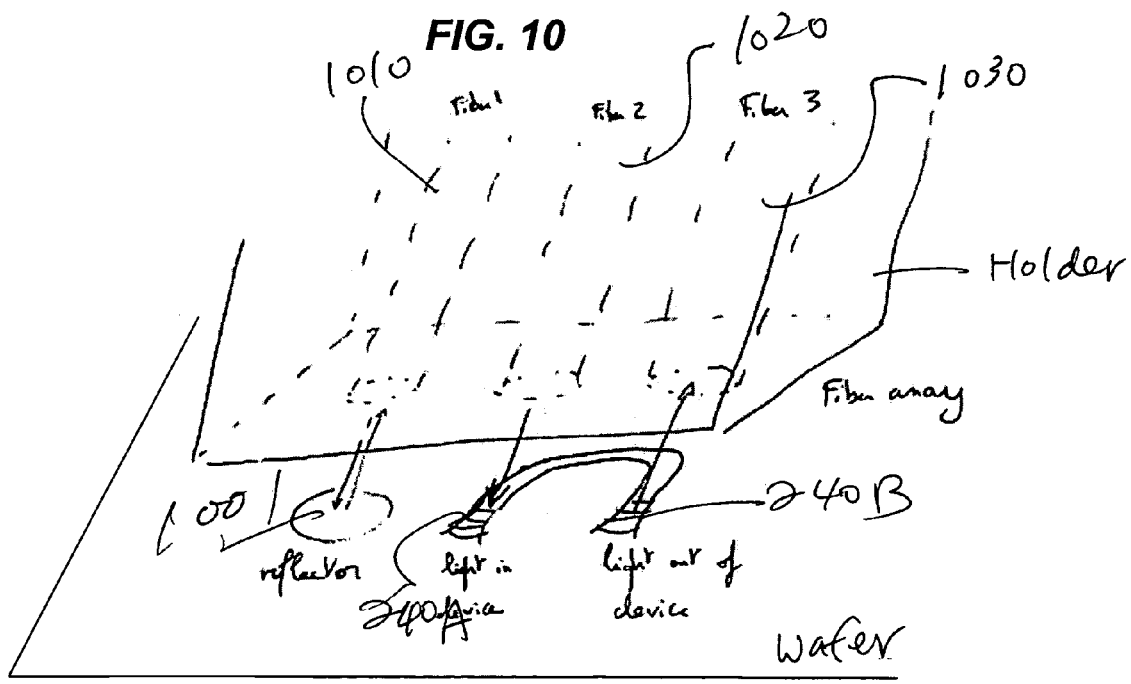

FIG. 10 shows one example of using a fiber array with two or more fibers for alignment and optical testing. In this example, three fibers 1010, 1020, and 1030 are shown to form a linear fiber array corresponding to a dot-shaped alignment reflector 1001 for optical alignment, a first optical I/O port 240A for receiving light and a second optical I/O port 240B for output light, respectively. The fiber 1010 is dedicated for alignment with the alignment dot 1001 and the fibers 1020 and 1030 are dedicated for optical testing of the ports 240A and 240B. The fiber array is adjusted relative to the wafer to maximize the reflected power from the alignment mark 1001 that is collected by the fiber 1010 to achieve the optical alignment of the fibers 1020 and 1030 for optical testing. As illustrated, the fibers in the array are engaged to a fiber array mount. A substrate with parallel V grooves with proper spacings may be used to hold and fix the fibers in position to form the fiber array.

The optical alignment of a fiber array with respect to the corresponding optical I/O ports, optical components, or alignment structures on the die or wafer, however, presents a challenge in aligning all fibers. One technical issue is the yaw alignment of the fiber array by adjusting the rotational position of the fiber array around an axis that is perpendicular to the wafer surface. FIG. 11A shows a situation where one fiber in the fiber array 1120 is aligned with a corresponding optical port or an alignment structure in an array 1110 of ports or alignment structures on the die 1100 while the other fibers are misaligned with their corresponding ports due to a yaw of the fiber array 1120 relative to the array 1110 of the ports on the die 1100.

The wafer positioner may have a rough yaw adjustment to change the angle of the wafer around the vertical Z axis. This rough yaw adjustment may be used in the initial alignment of the wafer after the wafer is placed on the wafer positioner.

However, this rough yaw alignment in the wafer positioner may not be sufficient to address the above alignment issue. In recognition of this, a fine yaw optimization mechanism based on a yaw adjustment in the optical probe positioner and an alignment loop on the wafer may be implemented and operated in combination to address this alignment issue.

Referring back to FIG. 4, the optical probe positioner may have its own translational and orientation adjustments that are independent of the adjustments in the wafer positioner to provide fine adjustments to the relative position and rotation between the optical probe and the wafer. The fine yaw adjustment in the optical probe positioner is used here to achieve the fine yaw alignment of the fiber array in the optical probe.

FIG. 11B shows the die 1100 on a wafer that includes an optical alignment loop 1130 having two optical I/O couplers 1131 and 1132 separated from each other to define a line parallel to the array 1110 of optical ports or optical components on the die 1100 to be aligned with the corresponding fiber array 1120 of an optical probe. The two couplers 1131 and 1132 are spaced to correspond to two fibers in the fiber array 1120. The optical alignment loop 1130 includes an optical waveguide 1133 connecting the two optical I/O couplers 1131 and 1132. The relative position between the array 1110 of optical ports or components and the alignment loop 1130 is known and the wafer positioner may be used to move the fiber array 1120 from its aligned position with the alignment loop 1130 to align with the array 1110 of optical ports or components according to this known relative position without additional optical alignment.

In operation, the fiber array 1120 is first aligned with the alignment loop 1130 by aligning two couplers 1131 and 1132 to two corresponding fibers in the fiber array 1120. One of the two fibers is used to send a probe beam to the alignment loop 1130 and the other fiber is used to receive light output from the alignment loop 1130. When the fiber array 1120 is perfectly aligned with the alignment loop 1130, the optical power coupled from the fiber array 1120 into one side of the alignment loop 1130 is received from the other side of the alignment loop 1130 and is maximized. Any yawing of the fiber array 1120 that deviates the fiber array 1120 from this alignment condition can cause the output power from the alignment loop 1130 to decrease or to disappear. Hence, the fine yaw adjustment in the optical probe positioner is used to vary the yawing of the fiber array relative to the fixed wafer to monitor the optical power received in the receiving fiber in the fiber array. This yawing is performed until the optical power in the receiving fiber is optimized. After this yaw optimization, the fiber array may be moved to align with the array of optical ports to perform optical tests.

Figure 11C:
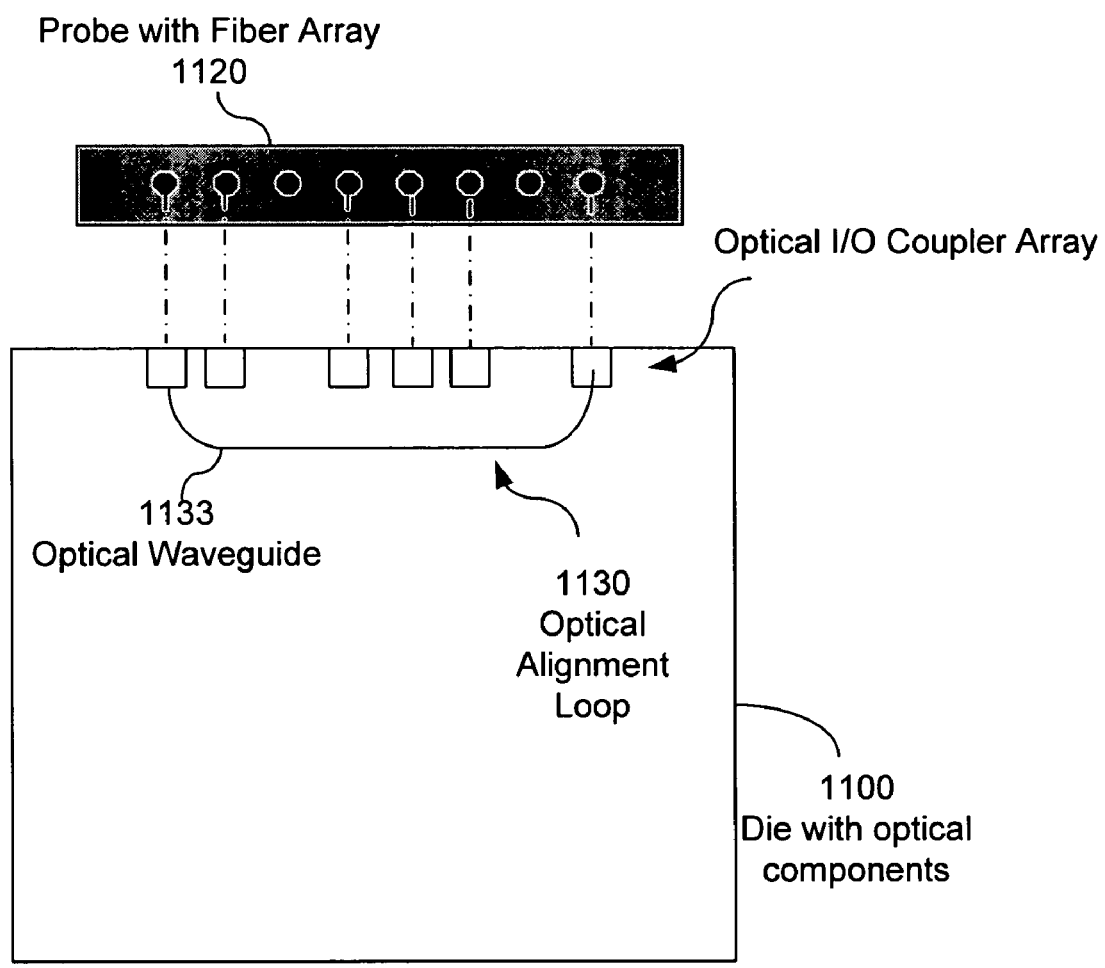

Alternatively, the optical alignment loop 1130 may be formed in two of the optical ports within the array 1110 of ports on the die 1100. FIG. 11C illustrates one example of this design. In this case, after the yaw alignment, the fiber array 1120 is the aligned position and is ready for optical testing of other ports without any further adjustment of the fiber array 1120.

The fine yaw optimization for a fiber array may also be implemented with two or more reflective or diffractive alignment structures that each receive light from a fiber in the fiber array and direct received light back to the fiber. For example, the wafer may be fabricated with a line of two or more optical alignment marks such as dot marks that spatially correspond to two or more fibers in the fiber array, respectively. Referring to FIG. 11B, the two optical ports 1131 and 1132 for the alignment loop may be replaced by two reflective optical alignment dot marks in implementing this technique. More than two dot marks may be used. After an initial alignment to align the fibers with the alignment marks to receive returned light in the fibers, the optical probe positioner may be adjusted to finely vary the yaw angle of the fiber array relative to the wafer. The total optical power received by all receiving fibers in the fiber array may be maximized to optimize the yawing. Next, the wafer positioner is used to change the lateral position of the wafer to place the fiber array above the array of optical ports to perform optical tests.

The above line and dot alignment marks and the alignment loops exemplify the use of one or more optical reflective or diffractive alignment structures with a distinctive spatial pattern to define a reference position. When two or more alignment structures are used in combination for alignment, one or more the alignment structures in the combination may be used as referencing structures (e.g., one or more line marks) for optically guiding the optical probe to an optical alignment structure that defines that reference position (e.g., a dot alignment mark) in the combination. Any combination that produces a distinctive pattern may be used. As another example, two orthogonal reflective alignment line marks that intercept at a crossing point may be used as a combination where the line marks guide the optical probe and the cross point defines the reference position.

Figure 12A:
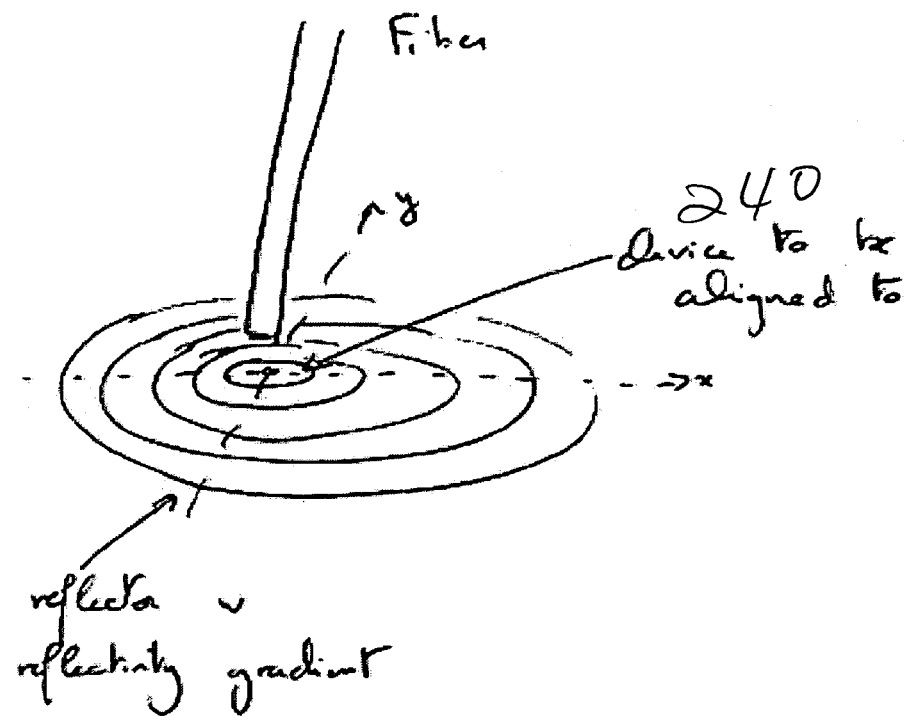
FIGS. 12A, 12B, 13, and 14 illustrate examples of alignment structures having spatially-varying optical properties and their operations.
Figure 13:
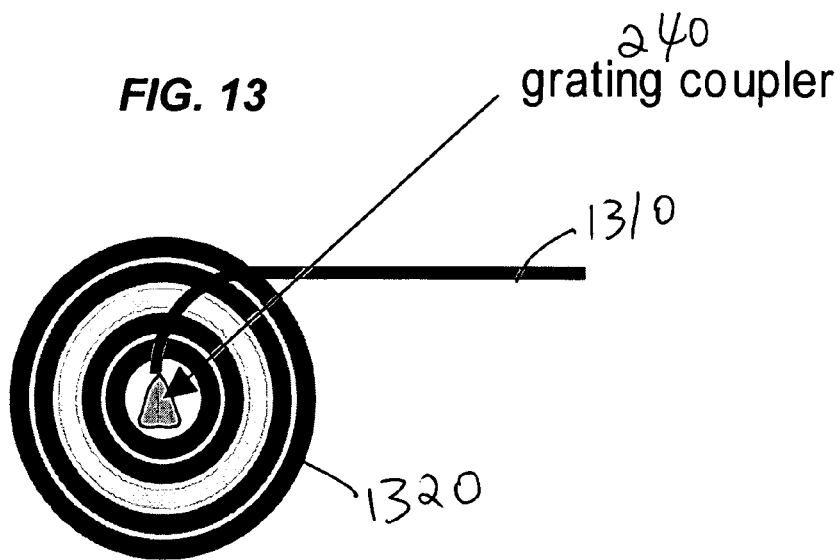
Figure 14:
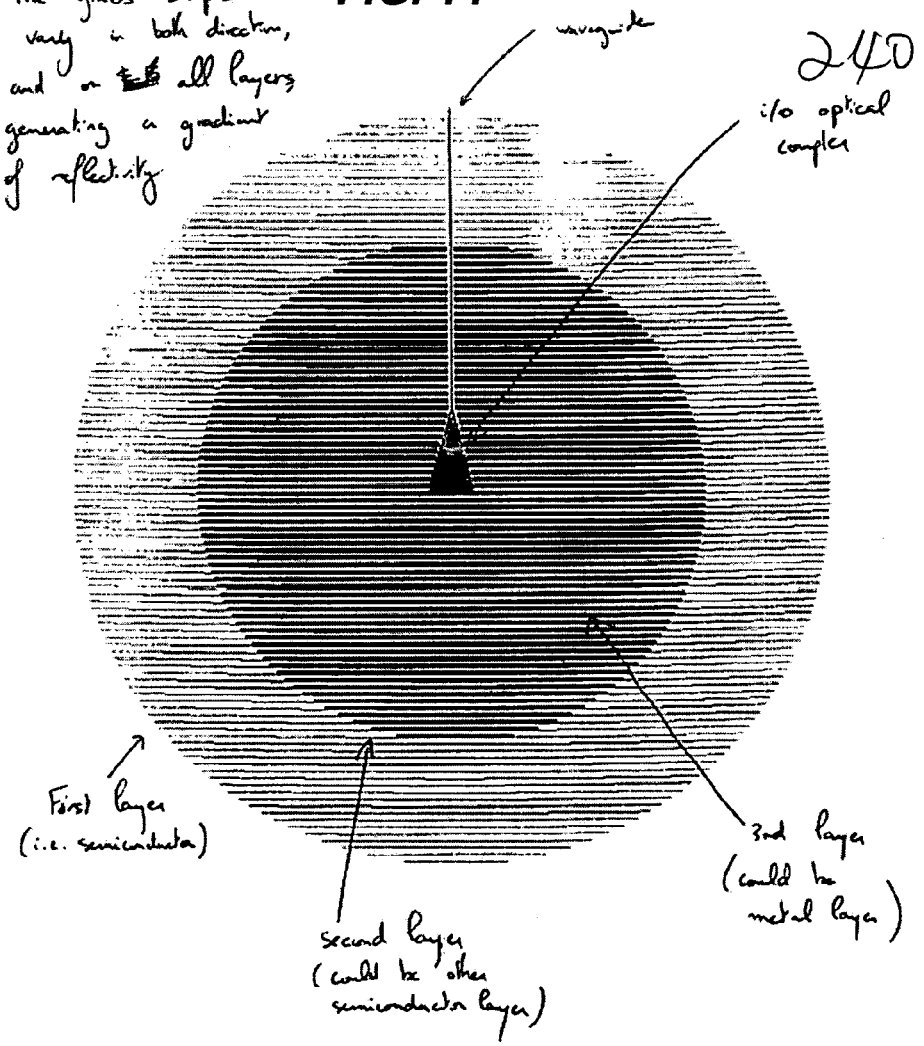

As further examples, a single alignment structure may also be used for aligning the optical probe a defined reference position. FIGS. 12A, 13, and 14 show three different examples where an alignment structure is formed close to a target I/O port 240 on the wafer with a spatially varying reflectivity to indicate the location of the port 240. Such a spatially-varying alignment structure may surround the port 240. Once the reflective alignment structure is located, a local, more precise spatial scan of the fiber position over the found alignment structure may be used to precisely position the fiber to the port 240 under the guidance of the varying reflectivity from the alignment structure. For example, a reflectivity gradient may be built in to the alignment structure so that a positioning control feedback mechanism may be used to automatically follow the gradient to the desired final position of the fiber relative to the port 240.

Figure 12B:
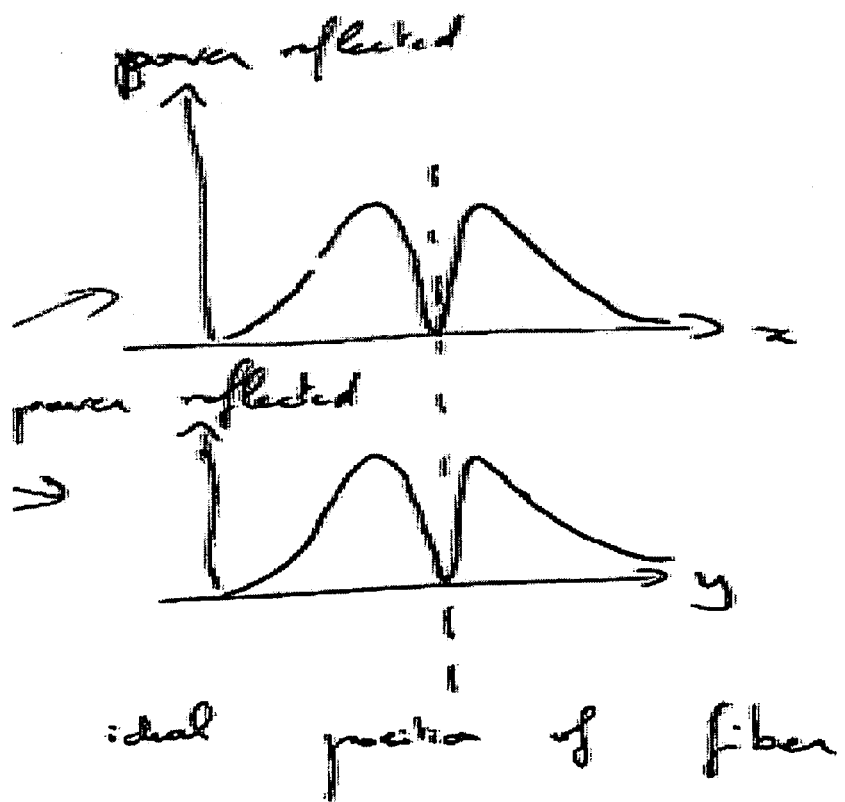

FIG. 12A shows an alignment structure surrounding a port 240 with a gradually-increasing reflectivity profile as the distance to the port 240 decreases. FIG. 12B further shows the reflected power from this alignment structure as the fiber position is scanned along x and y directions through the port 240. A dip in the reflected power indicated the position of the final fiber position if the port 240 does not send out light during the alignment.

FIG. 13 shows another alignment structure surrounding a port 240 with a step-wise changing reflectivity profile as the distance to the port 240 changes. Concentric reflective circles 1320 with varying optical reflectivities may be used as such an alignment structure on a wafer. The optical reflectivities of the different circles may increase or decrease with the radius from the center of the circles so that a change in the reflected power with position may be used to indicate position of the fiber over the circles. An optical coupler 240 is placed at the center of the concentric reflective circles and is optically connected to a waveguide 1310 or an optical device. In operation, the wafer positioner is controlled to perform a circular or spiral scan to determine the position of the fiber relative to the concentric reflective circles 1320. The varying reflected optical power from the circles may be used to determine the center of the circles. Next, the wafer is moved to place the fiber above the center of the circles to align with the coupler 240.

FIG. 14 shows yet another example of an alignment structure surrounding an I/O port 240 on the wafer. In this example, the alignment structure uses multiple layers to achieve a spatially varying reflectivity profile that can guide the fiber to the surrounded port 240. As the distance to the port 240 changes, the layer structure of the alignment structure and thus the resultant reflectivity change accordingly.

The use of the above and other alignment structures is in part based on the recognition that a wafer positioner may have insufficient accuracy for optical alignment. The wafer positioner is initially used to move from one die to another on the wafer. One or more optical alignment structures allow for an accurate identification of a "local" reference for a die, i.e., the dot mark 520 in the above example, and uses the local reference to make further small movements of the wafer within the scale of a die to accurately locate the final position of a target location in that die. At this location, the optical probe and the selected optical coupler 240 within the die are approximately aligned and hence an optical or electronic response caused by the optical probe can be generated.

Referring back to the system 400 in FIG. 4, the fine alignment for the optical probe may be achieved by using the optical probe positioner. In operation, the wafer positioner sets the initial relative position between the wafer and the optical probe and maintains the wafer at this position. The optical probe positioner, which was set at a fixed position in prior alignment process, is controlled to move the optical probe relative to a corresponding optical I/O coupler to find an optimized location. The movement of the optical probe is controlled by the optical probe positioner according to a search pattern, such as a spiral or circle pattern. The optical probe positioner may include high resolution mechanical stages such as stepper motors, or piezo stages. Upon completion of this search, the optical probe is fixed at the optimized location, such as one that yields maximum received optical or electrical signal. At this point, the optical alignment is completed and the optical test can be carried out at this location. After completion of the test, the system then moves the wafer to place the probe at another location for optical tests.

Figures 15A, 15B:
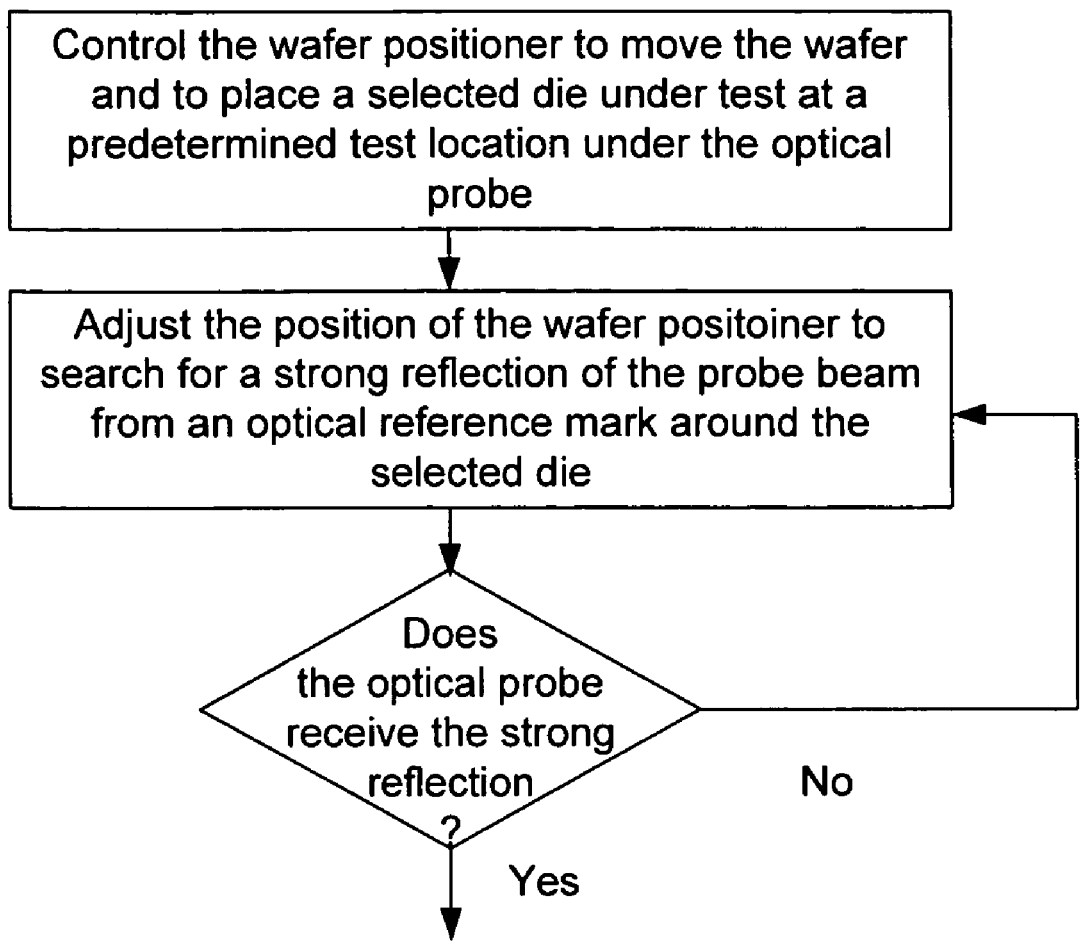
FIGS. 15A, 15B, and 15C show an exemplary workflow for aligning a wafer for optical testing.
Figure 15C:
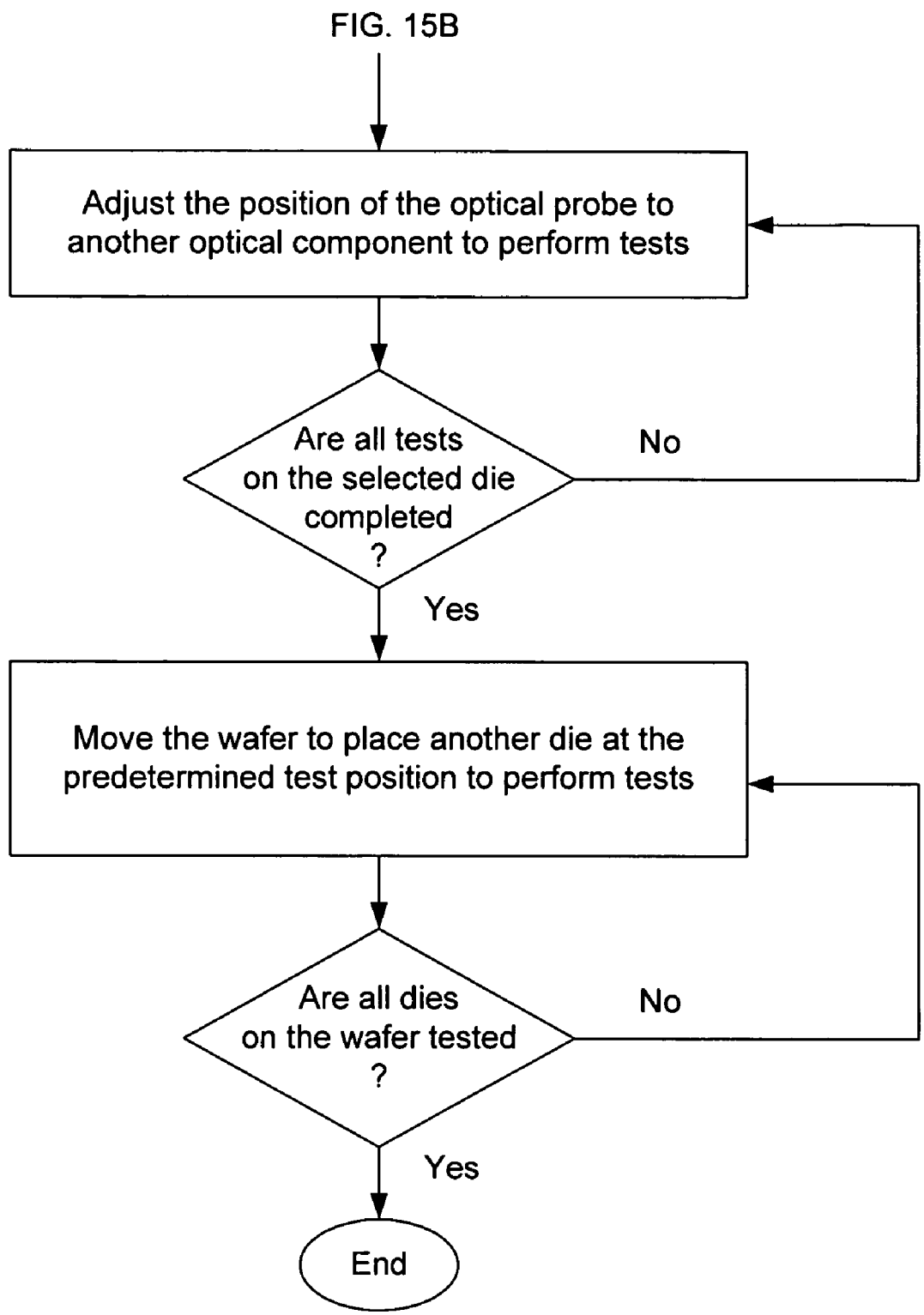

FIGS. 15A, 15B, and 15C show an exemplary workflow of this alignment process. As discussed above, a single alignment structure on the wafer may suffice to establish an initial x, y, and z position when the wafer positioner has positioning stages orthogonal to each other. More than one alignment structures may also be used in this alignment process.

In finely adjusting the optical probe in a selected search pattern by using the optical probe positioner, different search mechanisms may be used. In one implementation of a "hill climbing" algorithm, for example, the optical probe positioner may be moved through a sequence of discrete positions and measurements of the received responses are taken at each of the discrete positions. The measurements are used to estimate the gradient of the received responses as a function of the discrete positions and to predict the next position to move the optical probe to increase the received response.

Alternatively, the fiber probe may be driven by the optical probe positioner to spatially move in a circular pattern around a center at a low frequency sufficient for the optical detector in the optical probe to respond the change of optical power in the received light. When an optical alignment dot mark or an optical I/O port 240 is located at the center of the circle, the received optical power or a corresponding electronic response from the dot mark or the port 240 remains substantially at a constant when the optical probe at different positions of the circle. Under this condition, the search is completed and the optical probe positioner is controlled to place the optical probe to the center of the circle. If, however, the received optical power or the generated electronic response varies in amplitude with the position of the optical probe in the circle, the dot mark or the port 240 is not located at the center of the circle. At this off-the-center position, the output response is a sinusoidal function of time and the X or Y position is also a sinusoidal function of time.

Figure 15D:
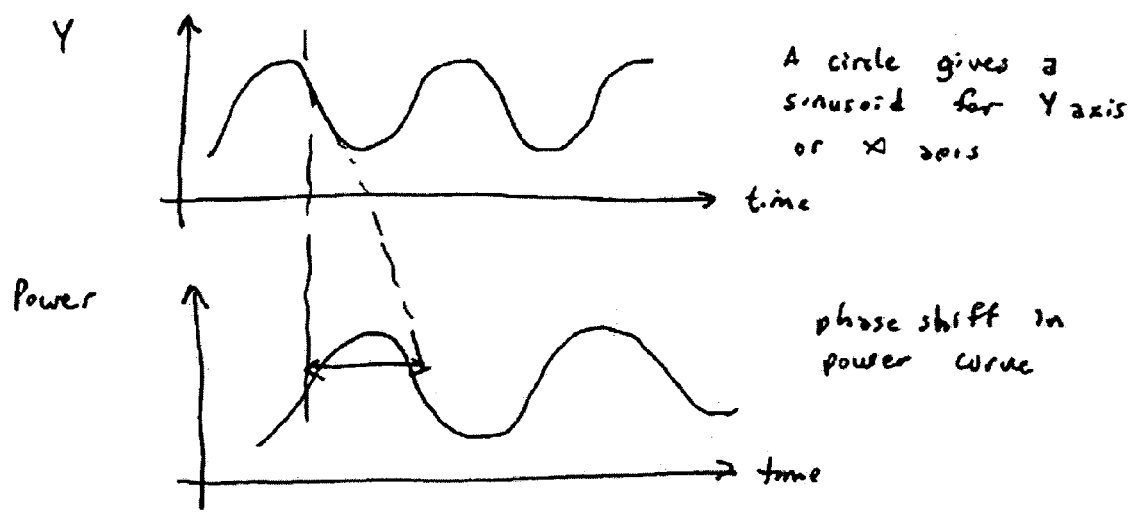
FIG. 15D illustrates operation of an exemplary search based on moving the optical probe in a circular motion.

FIG. 15D illustrates an example of the measured Y position and the signal power as a function of time and their relative phase. The relative phase between the position and the power indicates the direction along which the center of the circle deviates from the dot mark or the port 240. Based on this relative phase, the optical probe positioner may be controlled to adjust the optical probe to move the center of the circle. At the new position, the measurements are taken and additional adjustments may be made if needed. This process continues until the received power is a constant and the center of the circular motion coincides with the dot mark or the port 240. This algorithm may operate at a higher speed than the hill climbing method. One implementation of this algorithm a system under a trade name of "NanoTrak" and marketed by Melles Griot, Ltd., of London. See also U.S. Pat. No. 6,555,983 assigned to Melles Griot.

Certain optical components or devices in a die may not produce a sufficiently measurable response to the optical probe even though the optical alignment may be perfect. For such an optical component, it is difficult to determine whether the optical probe is satisfactorily aligned to the corresponding optical coupler 240 connected to the optical component. Examples of such optical devices include certain wavelength-sensitive optical devices such as optical interferometers, resonators, optical wavelength filters when the wavelength of the probe beam happens to be between two spectral peaks in the spectral response. An Arrayed Waveguide Grating (AWG) is also such an optical device. In addition, optical detectors such as photodetectors and devices that produce a non-optical signal in response to received light.

To address this technical issue in optical alignment, certain optical devices that are insensitive to wavelength or exhibit some dependence on wavelength but still can produce a measurable response may be fabricated on the die or wafer as an optical alignment device for fine alignment. In some implementations, such an optical alignment device may be located close to the target optical device as an optical alignment reference. Hence, if the coupler for the alignment device is aligned with the optical probe, the coupler for the target device near the alignment device can also be aligned with the optical probe after a known, pre-determined, short move that can be sufficiently accurate. Since the move is very short due to the closeness between the alignment device and the target device by the design, an error in alignment caused by the move may be negligible.

In one implementation, the following process may be used to achieve the alignment based on the above alignment device. First, a coarse alignment using the wafer positioner is performed to align the optical probe to the optical alignment device adjacent to the target optical device. This alignment step may use one or more optical alignment structures on the wafer. Second, the optical probe is finely adjusted by controlling the optical probe positioner to optimize the optical alignment between the optical probe and the optical alignment device. Next, a short, accurate move to the target device is performed and the target device is presumed to be aligned with the optical probe. Optical testing on the target device can then be performed.

Figure 16:
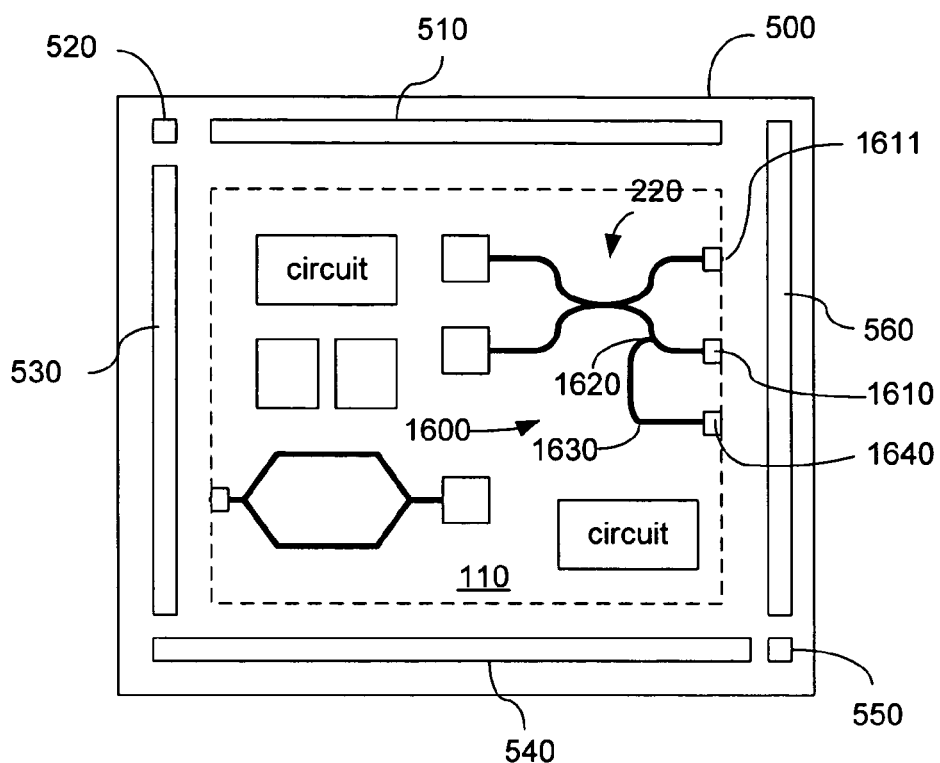
FIGS. 16, 17, and 18 illustrate examples for optical alignment devices that facilitate alignment of certain optical devices such as wavelength-sensitive devices and optical detectors.

FIG. 16 shows one example of an optical alignment device 1600 adjacent to a wavelength-sensitive optical element 220 such as a Mach-Zehnder interferometer device. The device 1600 includes an optical splitter or tap 1620 to split a fraction of a beam coupled into the device 220 from the coupler 1610 into a waveguide 1630. The waveguide 1630 terminates at the same edge of the die 110 where the coupler 1610 is located. An optical coupler 1640 is implemented at the terminal port of the waveguide 1630. Hence, as long as there is an optical input to the port 1610, the port 1640 will produce an optical output, or vice versa. Therefore, the optical output at the coupler 1640 may be used to align the optical probe at the coupler 1610. The alignment for the coupler 1611 at another port of the device 220 may be achieved by moving the optical probe aligned with the coupler 1610 to the coupler 1611 in a short and known position offset.

Figure 17:
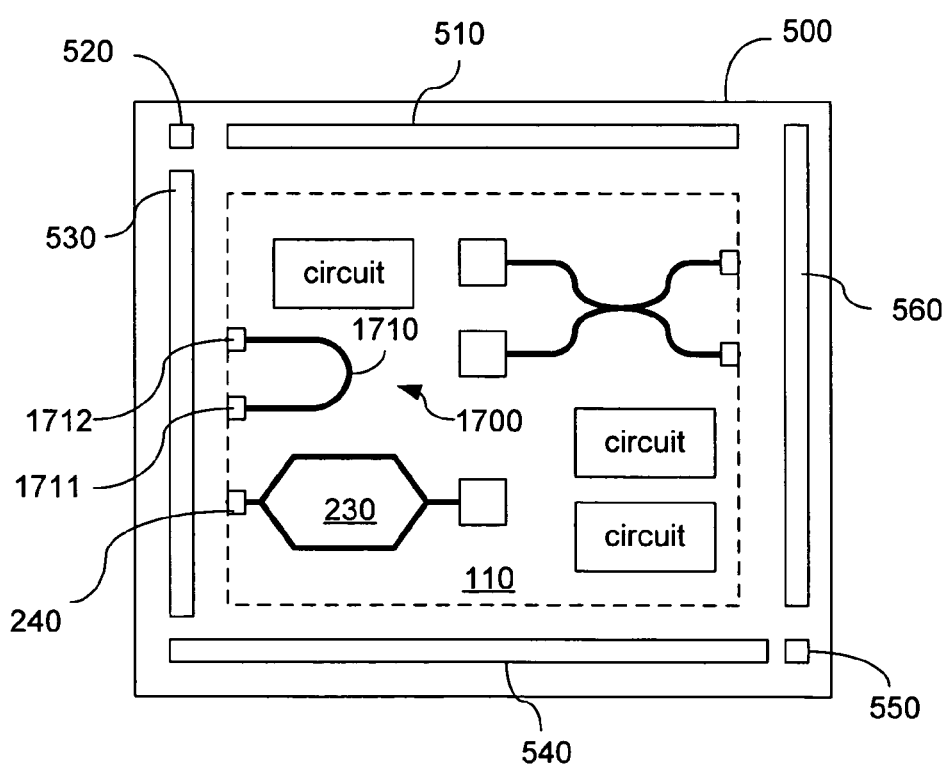

FIG. 17 shows another example of an optical alignment device 1700 located close a target device 230 with an I/O optical coupler 240 in die 110. The alignment device 1700 a waveguide loop having a waveguide 1710 connected between two terminal ports having two I/O couplers 1711 and 1712 on the same edge of the die 110 and close to the coupler 240. The optical probe may be designed to have a linear array of three fibers spatially corresponding to the ports 240, 1711, and 1712. The fiber probe is aligned by sending a probe beam into the waveguide loop 1700 and optimizing the output to achieve the alignment with the port 240 of the adjacent device 230. In this design, the alignment with the alignment device 1700 and the alignment with the target device 230 are completed at the same time.

Figure 18:
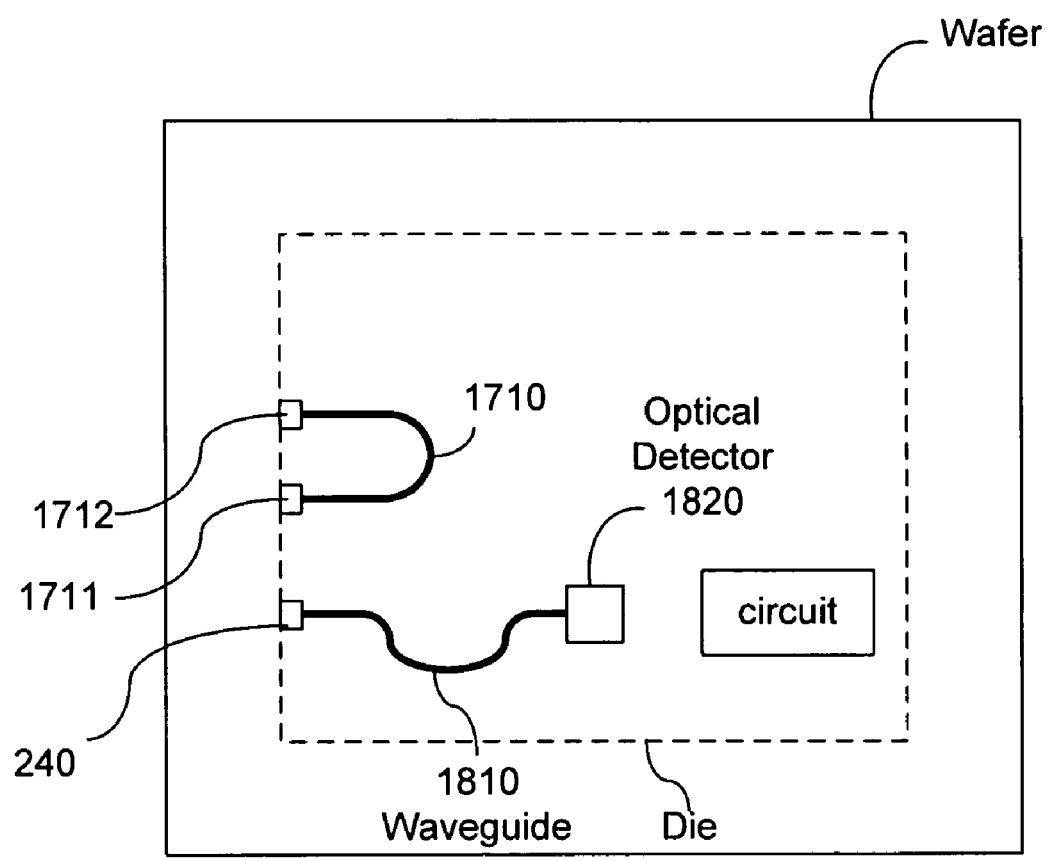

Another application of the optical alignment loop 1700 shown in FIG. 17 is to assist alignment of the optical input to an optical detector 1820 that receives light from an I/O coupler 240 through a waveguide 1810 as shown in FIG. 18. The optical detector 1820 produces an electrical output in response to an optical input. In absence of an electronic probe to measure the detector output, it can be difficult to align the optical probe to the port 240 for the optical detector 1820. The alignment loop 1700 may be placed adjacent to the port 240 for aligning the optical probe to the port 240. The optical probe may be designed to have a linear array of three fibers spatially corresponding to the ports 240, 1711, and 1712. The fiber probe is aligned by sending a probe beam into the waveguide loop 1700 and optimizing the output to automatically align the third fiber with the port 240 for the optical detector 1820.

In the above optical alignment with the optical probe on top of the wafer, the height of the end facet of the optical probe and local wafer surface may be set at a close distance, e.g., from about 5 microns to about 25 microns, to ensure efficient coupling of the probe light into the optical device under test. This close spacing between the probe and the wafer might cause a collision of the probe to the wafer during a lateral movement between the optical probe and wafer because the wafer held down on a vacuum chuck is not perfectly flat. The typical unflatness of the wafer may be, for example, about 20 to 30 microns or more in some commercial probe stations. This collision may damage the optical probe and the devices on the wafer.

This collision may be avoided by controlling the vertical position of the optical probe relative to the wafer at a safely large distance to separate the optical probe from the wafer when laterally moving the probe from one location on the wafer to another. After the optical probe is placed at a desired lateral position relative to the wafer, the distance between the optical probe and the wafer may be adjusted to the desired small spacing for optical testing. In this regard, the two vertical positions in the wafer positioner for the "testing position" and the "separate position" for setting the vertical positions of a wafer may be used. During the optical testing, the wafer positioner is set to the "testing position" to be close to the optical probe. Before a lateral adjustment of the relative position between the optical probe and the wafer, the wafer positioner is set to the lower separate position to separate the wafer from the optical probe. At this lowered separate position, the lateral adjustment can be safely made without colliding the optical probe into the wafer.

During the optical testing, the spacing between the optical probe and the wafer is set to a close distance, e.g., from about 5 microns to about 25 microns to achieve efficient optical coupling. It is beneficial to keep this close distance during optical testing as a constant in testing different optical components at different locations on the wafer. The optical probe positioner may be used to finely adjust and maintain this close distance between the optical probe and the wafer for the optical testing.

In this regard, a spacing monitor and an active feedback control may be used in the optical probe positioner to monitor the distance between the optical probe and the wafer when aligning the optical probe and to control the distance at the predetermined constant distance based on the monitored spacing. In one implementation, a spacing sensor may be used to measure the height of the optical probe from the wafer surface. This sensor may be a capacitance spacing sensor that is mounted at the optical probe.

Figure 19:
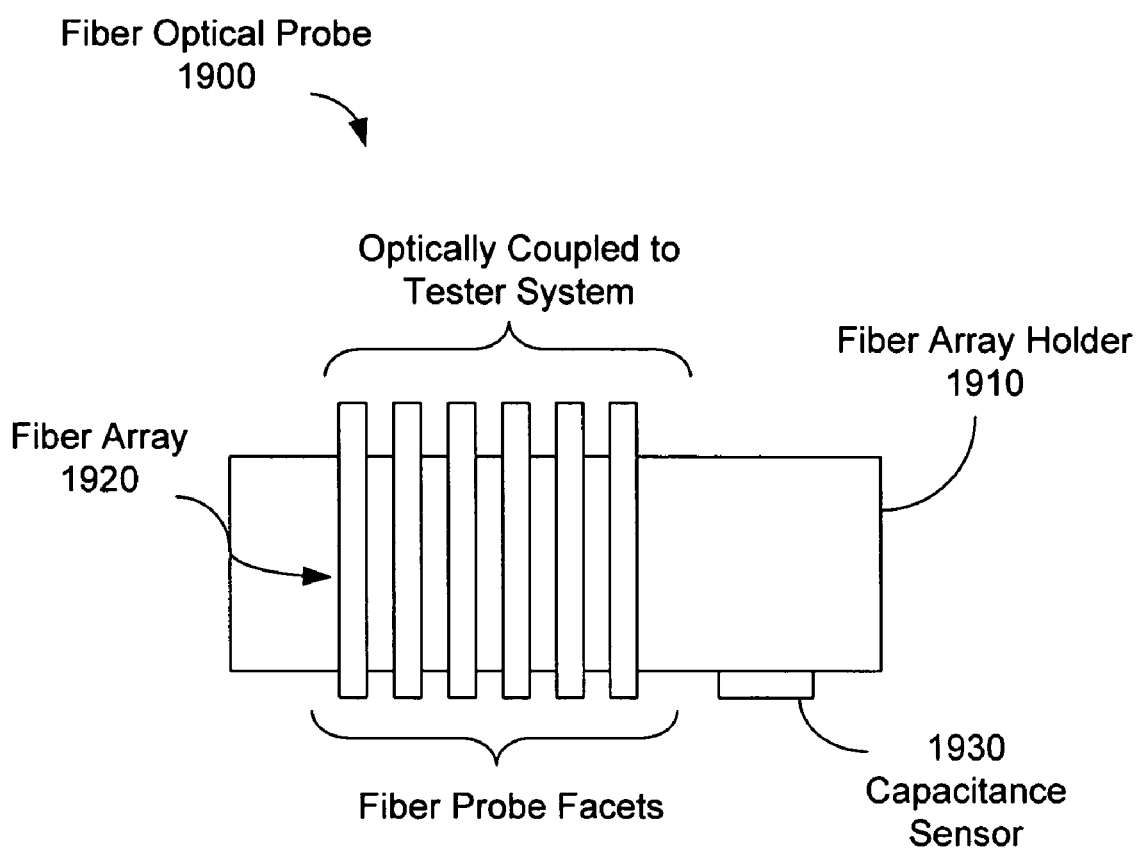
FIG. 19 shows one example of an optical probe suitable for the system in FIG. 4 having a capacitance sensor.

FIG. 19 shows an example of an optical probe 1900 suitable for implementing the above capacitance sensor using the wafer-level testing system in FIG. 4. This particular probe 1900 is built on a fiber array holder 1910. A fiber array 1920 with multiple fibers with predetermined spacings is fixed to the holder 1910. The fiber array 1920 is designed to correspond to the optical couplers for one or more optical components or devices in certain dice on a wafer design. As an example, some of the fibers in the array 1920 may correspond to the couplers 1611, 1610 and 1640 on the die in FIG. 16 or the couplers 240, 1711, and 1712 on the die in FIG. 17. As illustrated, a capacitance sensor 1930 may be engaged to the fiber holder 1910 near the fiber probe facets to provide a measurement for the height above the wafer surface. Based on the measurement from the sensor 1930, the optical probe positioner controls its vertical adjustment to set the spacing between the optical probe and the wafer surface.

Figure 20:
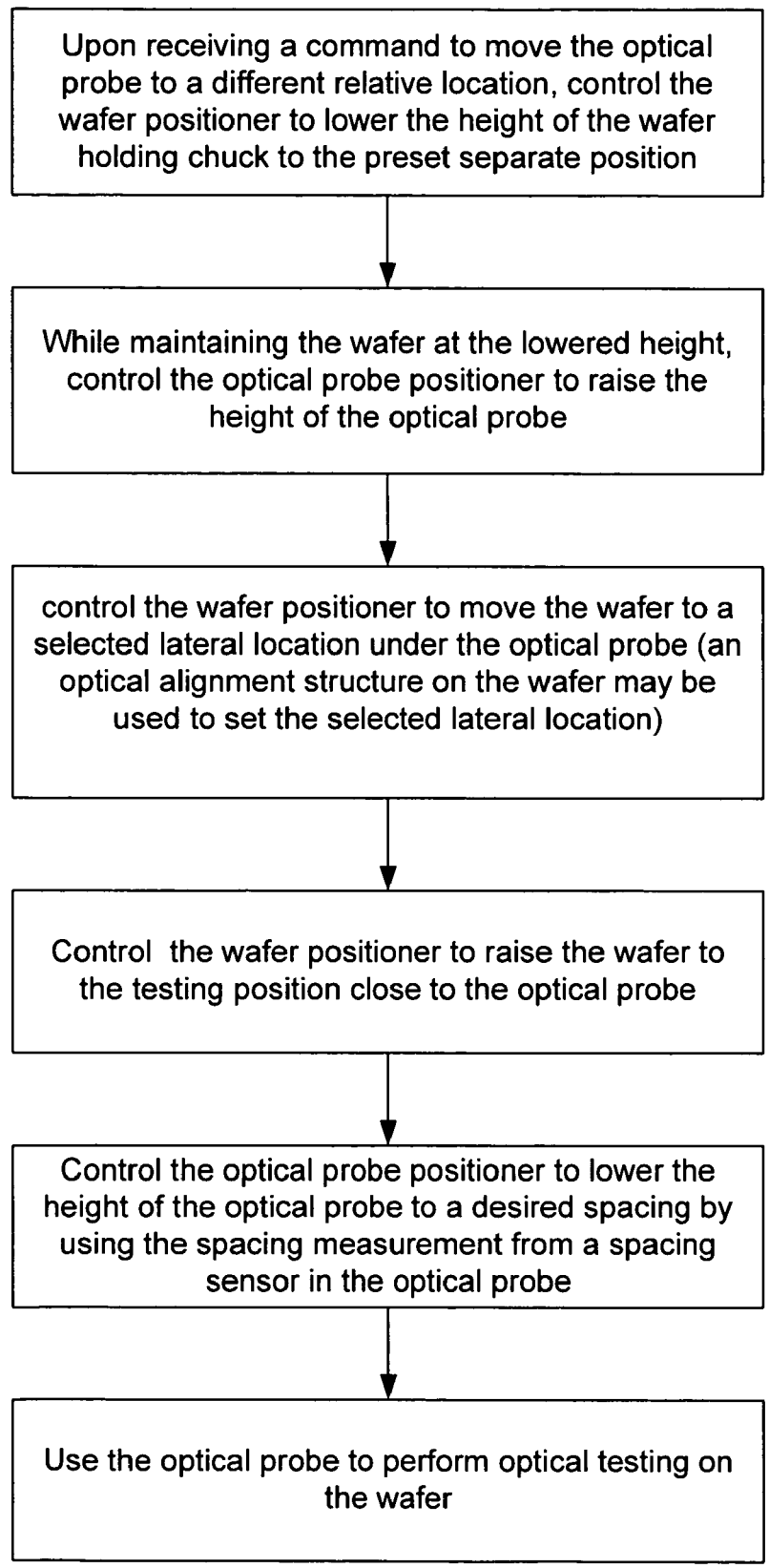
FIG. 20 shows an exemplary workflow for adjusting the relative vertical spacing between the optical probe and the wafer in a lateral adjustment during optical testing.

FIG. 20 shows an exemplary workflow for adjusting the vertical spacing between the optical probe and the wafer based on the separate vertical controls in the wafer positioner and the optical probe positioner.

The above optical alignment and optical testing techniques may also be used for attaching one or more fibers to optical ports on surface a wafer or a chip. The fibers may be polarization maintaining fibers, single-mode fibers, multimode fibers, or a combination of these and other fibers. For example, the system 400 in FIG. 4 may be used to first align a single fiber to an optical port on the fiber or align a fiber array to an array of optical ports on the wafer. Next, an adhesive is applied to an optical port. Subsequently, a corresponding aligned fiber is lowered in its position to contact the optical port and the adhesive thereon. This contact is maintained until the adhesive is properly cured so that the fiber and the optical port are bonded together. The adhesive may be a UV curable adhesive so that UV light may be used to illuminate the contact interface between the optical port and the fiber to cure the adhesive. As another example, the adhesive may be a thermal curable adhesive and heat may locally applied to the interface to cure the adhesive. Alternatively, the adhesive may be applied to the contact interface between the optical port and the fiber after the fiber is brought to contact with the optical port. Other applications of the above optical alignment and testing techniques are also possible.

Only a few implementations are described. However, it is understood that variations and enhancements may be made.

What is claimed is:

1. A device, comprising:
   a wafer having a wafer surface patterned to comprise an integrated component and an optical grating coupler, the optical grating coupler operable to couple light incident from a device above the wafer into the integrated component; and
   at least one optical alignment structure fabricated on the wafer surface and spatially separated from the optical grating coupler with a predetermined spatial offset, the optical alignment structure operable to direct at least a portion of incident light along a predetermined direction above the wafer surface to optically mark a relative position of the optical grating coupler.

2. The device as in claim 1, wherein the optical alignment structure is optically retro-reflective.

3. The device as in claim 1, wherein the optical alignment structure comprises an optical grating.

4. The device as in claim 1, wherein the optical grating is a Littrow grating.

5. The device as in claim 1, wherein the optical alignment structure is shaped as a dot.

6. The device as in claim 5, further comprising a second optical alignment structure having a line shape located relative to the dot.

7. The device as in claim 1, wherein the wafer further comprises an integrated electronic circuit element on the wafer surface.

8. The device as in claim 1, wherein the optical alignment structure comprises an optical device on the wafer.

9. The device as in claim 8, wherein the optical device comprises a waveguide and at least one optical coupler engaged to one end of the waveguide to couple light incident from a device above the wafer into the waveguide.

10. The device as in claim 1, wherein the optical coupler comprises a grating coupler.

11. The device as in claim 1, wherein the integrated component comprises a waveguide.

12. The device as in claim 1, wherein the integrated component comprises an optical detector.

13. The device as in claim 1, wherein the integrated component comprises an optical modulator.

14. The device as in claim 1, wherein the integrated component comprises an optical wavelength division multiplexer.

15. The device as in claim 1, wherein the integrated component comprises an arrayed waveguide grating.

16. The device as in claim 1, wherein the integrated component comprises an optical switch.

17. The device as in claim 1, wherein the integrated component comprises an optical directional coupler.

18. The device as in claim 1, wherein the integrated component comprises an optical splitter.

19. The device as in claim 1, wherein the integrated component comprises an optical amplifier.

20. The device as in claim 1, wherein the integrated component comprises an optical attenuator.

21. The device as in claim 1, wherein the wafer is patterned to comprise a plurality of dice, wherein at least one die is patterned to comprise the integrated component and the optical coupler and to further comprise an integrated electronic circuit.

22. The device as in claim 21, wherein the integrated electronic circuit controls an operation of the integrated component.

23. The device as in claim 1, wherein the optical alignment structure comprises an optical waveguide comprising input and output ports that are located adjacent to the integrated component, and wherein the input port comprises an input optical coupler to couple incident light into the optical waveguide and the output port comprises an output optical coupler to couple light out of the output port to optically mark the relative position of the optical coupler.

24. The device as in claim 1, wherein the optical alignment structure is an elongated optical alignment line structure, and the device further comprising a second optical alignment structure in a dot shape and spaced from and aligned with the elongated optical alignment line structure.

25. The device as in claim 1, wherein the optical alignment structure has a spatially varying reflectivity profile.

* * * * *